US010313529B1

(12) United States Patent
Lee et al.

(10) Patent No.: US 10,313,529 B1
(45) Date of Patent: Jun. 4, 2019

(54) DEVICE, SYSTEM AND METHOD FOR ADJUSTING VOLUME ON TALKGROUPS

(71) Applicant: MOTOROLA SOLUTIONS, INC., Chicago, IL (US)

(72) Inventors: Kang Bum Lee, Des Plaines, IL (US); Chun Wang, Oak Park, IL (US); Patricia Kelton, Chicago, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/001,466

(22) Filed: Jun. 6, 2018

(51) Int. Cl.
*H04B 17/00* (2015.01)
*H04M 9/08* (2006.01)
*H04M 3/56* (2006.01)
*G10L 25/63* (2013.01)
*G10L 17/26* (2013.01)

(52) U.S. Cl.
CPC ............. *H04M 9/082* (2013.01); *G10L 17/26* (2013.01); *G10L 25/63* (2013.01); *H04M 3/568* (2013.01)

(58) Field of Classification Search
CPC .... G06F 3/165; G10L 25/78; H04M 1/72569; H04M 2242/04; H04M 1/7255; H04W 4/12; H04W 4/90; H04H 20/59; H04L 12/1895
USPC .......................... 455/518, 519, 520, 521, 515
See application file for complete search history.

(56) References Cited

U.S. PATENT DOCUMENTS

| | | | |
|---|---|---|---|
| 6,885,874 B2 | 4/2005 | Grube et al. |
| 6,905,414 B2 | 6/2005 | Danieli et al. |
| 8,145,474 B1 | 3/2012 | Daily et al. |
| 9,191,218 B1 | 11/2015 | Rehder et al. |
| 9,313,585 B2 | 4/2016 | Lunner |
| 9,756,187 B2 | 9/2017 | Chintala |
| 2005/0195079 A1 | 9/2005 | Cohen |
| 2009/0298482 A1 | 12/2009 | Yen et al. |
| 2010/0217097 A1 | 8/2010 | Chen et al. |
| 2015/0199010 A1 | 7/2015 | Coleman et al. |

FOREIGN PATENT DOCUMENTS

EP  2163450 A1  3/2010

*Primary Examiner* — Phuoc H Doan
(74) *Attorney, Agent, or Firm* — Perry + Currier, Inc.

(57) ABSTRACT

A device, system and method for adjusting volume on talkgroups is provided. A controller determines that a given user is communicating in a talkgroup that includes a plurality of participants different from the given user, the controller having access to a memory storing historical biometric data indicative of stress for the given user. When a comparison of current biometric data of the given user with the historical biometric data indicates that the given user is in a stressed state: differentially increasing volume, in the talkgroup, of one participant, of the plurality of participants, relative to other participants of the plurality of participants, based on context data of one or more of the talkgroup and the plurality of participants.

20 Claims, 19 Drawing Sheets

US 10,313,529 B1

DEVICE, SYSTEM AND METHOD FOR ADJUSTING VOLUME ON TALKGROUPS

BACKGROUND OF THE INVENTION

First responders, such as police officers and/or dispatchers, and the like, responding to an incident may attempt to simultaneously and/or rapidly communicate on talkgroups, which may cause the first responders and/or dispatchers to suffer from cognitive overload, especially in high-stress situations. During such cognitive overload, the processing capabilities of the first responders and/or dispatchers may be lowered, adding to the difficulties of successfully completing assigned tasks and increasing danger levels of the first responders. Furthermore, during such cognitive overload, the first responders and/or dispatchers may ask others on the talkgroups to repeat information which may cause waste of processing resources and/or waste of bandwidth at the communication devices of the first responders and/or dispatchers, and/or waste of networking resources and/or bandwidth of a network over which the communication devices of the first responders and/or dispatchers are communicating.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
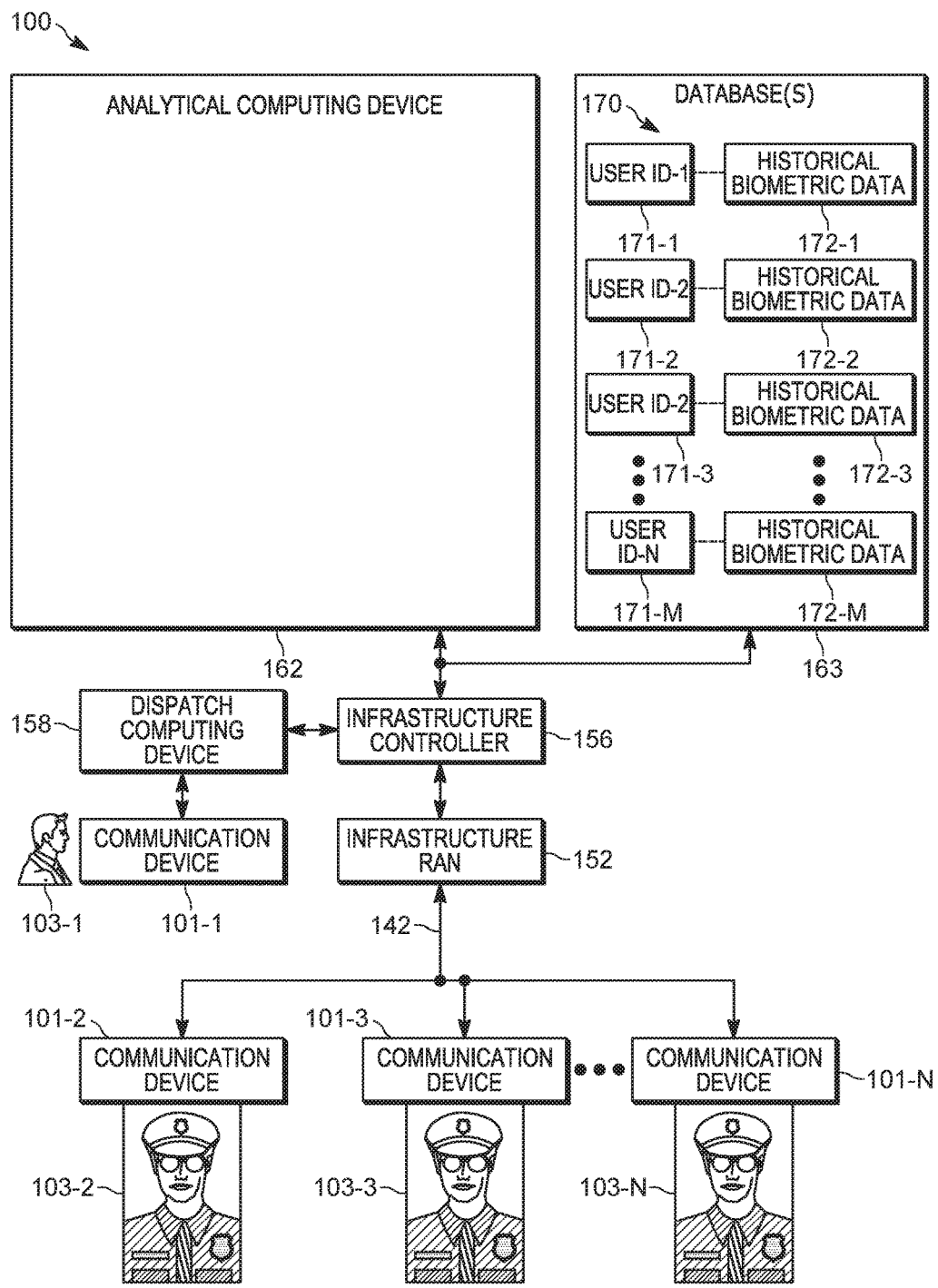
FIG. 1 depicts a system for adjusting volume on talkgroups in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

An aspect of the specification provides a device comprising: a communication unit; and a controller communicatively coupled to the communications unit, the controller having access to a memory storing historical biometric data indicative of stress for a given user that participates in talkgroups; the controller configured to: determine that the given user is communicating in a talkgroup that includes a plurality of participants different from the given user; and when a comparison of current biometric data of the given user with the historical biometric data indicates that the given user is in a stressed state: differentially increase volume, in the talkgroup, of one participant, of the plurality of participants, relative to other participants of the plurality of participants, based on context data of one or more of the talkgroup and the plurality of participants.

Another aspect of the specification provides a method comprising: determining, at a controller, that a given user is communicating in a talkgroup that includes a plurality of participants different from the given user, the controller having access to a memory storing historical biometric data indicative of stress for the given user; and when a comparison of current biometric data of the given user with the historical biometric data indicates that the given user is in a stressed state: differentially increasing, using the controller, volume in the talkgroup of one participant, of the plurality of participants, relative to other participants of the plurality of participants, based on context data of one or more of the talkgroup and the plurality of participants.

Attention is directed to FIG. 1, which depicts a system 100 for adjusting volume on talkgroups. The system comprises a plurality of communication devices 101-1, 101-2, 101-3 . . . 101-N, interchangeably referred to hereafter, collectively, as the devices 101 and, generically, as a device 101. Furthermore, each of the devices 101 are operated by, and/or associated with, a respective user 103-1, 103-2, 103-3 . . . 103-N, interchangeably referred to hereafter, collectively, as the users 103 and, generically, as a user 103.

The devices 101 are described in more detail below with respect to FIG. 2 and FIG. 3, however each of the devices 101 may comprise a mobile communication device, and the like, and/or a fixed communication device, and the like. As depicted, the device 101-1 comprises a fixed communication device operated, for example, by a dispatcher (e.g. the user 103-1 comprises a dispatcher), and the devices 101-2, 101-3 . . . 101-N each comprise a mobile communication device operated, for example, by a first responder such as a police officer (e.g. each of the users 103-2, 103-3 . . . 103-N may comprise a police officer).

One or more of the devices 101 (e.g. the devices 101-2, 101-3 . . . 101-N) may be configured for wirelessly communicating over one or more links 142 via a wireless infrastructure radio access network (RAN) 152 (described in more detail below) and via corresponding transceiver circuits. However, one or more of the devices 101 may be configured for wired communication, such as a communication device 101-1 of a dispatcher.

While in FIG. 1 four communication devices 101 of a number "N" of a plurality of communication devices 101 are depicted, the system 100 may include fewer than four, or more than four devices 101, for example tens, hundreds, or even thousands of devices 101. Furthermore, while only one dispatcher (e.g. the user 103-1) and a respective device 101-1 are depicted, more than one of the devices 101 may be operated by a respective dispatcher.

Furthermore, the devices 101 are generally configured for communication using talkgroups, including, but not limited to, talkgroups where audio, and no video, is communicated between the devices 101, and talkgroups where audio and video is communicated between the devices 101. In general, in such talkgroups, two or more of the devices 101 may participate in a group communication. For example, two, three, or more of the devices 101 may communicate in such talkgroups. The respective volume of speech of the users 103 on the talkgroups may further be controlled, as described in more detail below.

Figure 2:
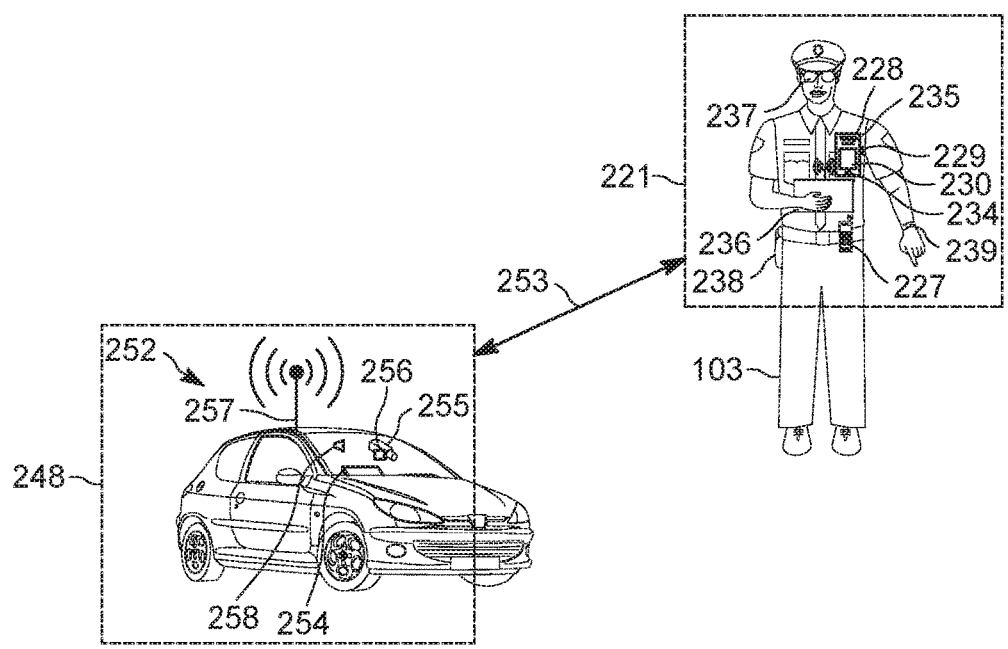
FIG. 2 depicts example communication devices in according with some embodiments.
Figure 3:
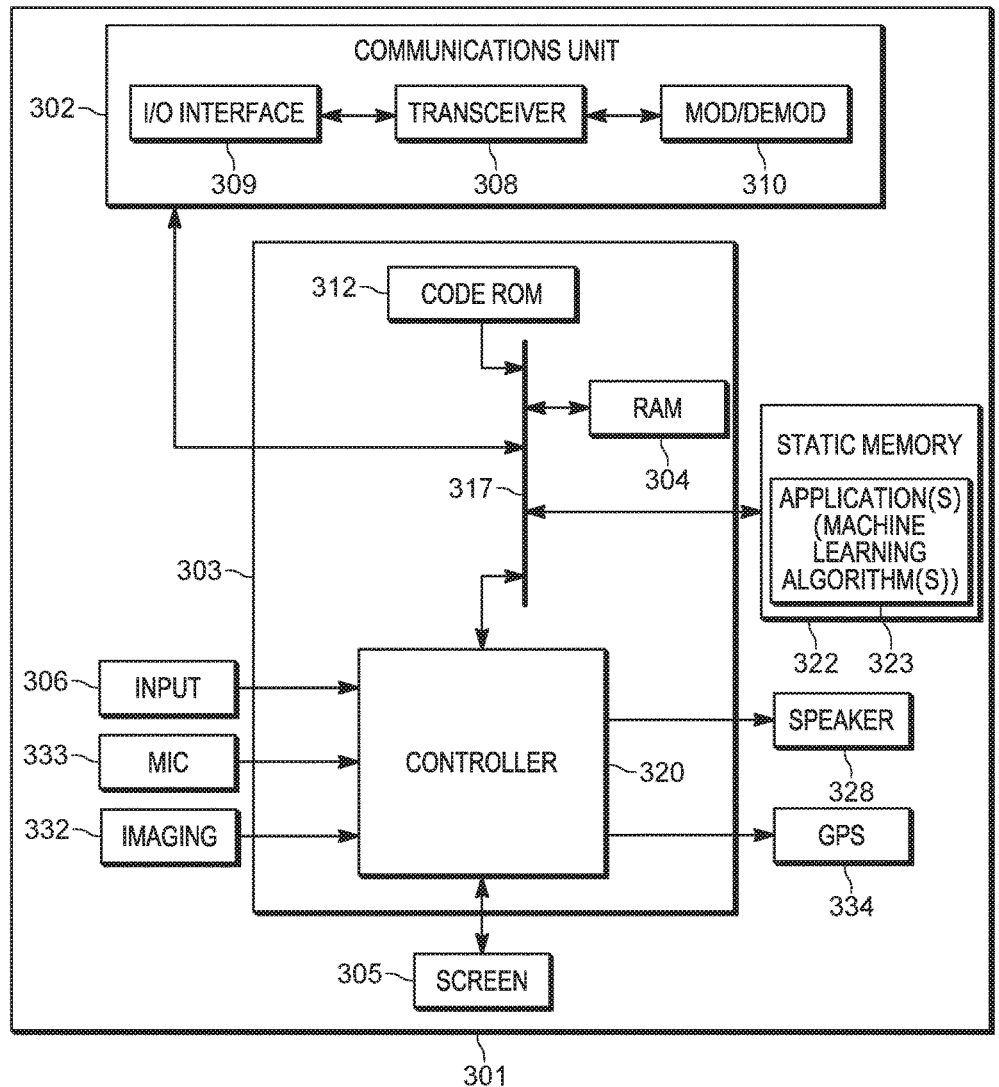
FIG. 3 depicts a device diagram showing a device structure of a device for adjusting volume on talkgroups in accordance with some embodiments.

Hence, as depicted in FIG. 2 and FIG. 3, each of the devices 101 include and/or is in communication with, at least: a speaker, over which audio from at least a talkgroup, in which a device 101 is participating, is played to convey the audio to a respective user 103; and a microphone, over which audio is received from a respective user 103 to be conveyed to other devices 101 participating in the talkgroup.

When an incident occurs, such as an emergency and/or a public safety incident, and the like, the users 103 of the devices 101 may begin to attempt to talk simultaneously on a talkgroup; when one or more of the users 103 is in a stressed state, then such a user 103 may suffer from cognitive overload, and ask other users 103 on the talkgroups to repeat information which may cause waste of processing resources and/or bandwidth at the devices 101, and/or cause waste of networking resources and/or bandwidth of a network over which the devices 101 are communicating.

While one or more of the devices 101 may communicate via wired links (e.g. such as the device 101-1), the infrastructure RAN 152 is illustrated in FIG. 1 as providing wireless coverage for the devices 101. In general, the infrastructure RAN 152 communicatively may couple the devices 101 to a single infrastructure controller 156, which in turn is in communication with a dispatch computing device 158, which may include one or more dispatch terminals (not depicted) operated by one or more dispatchers. As depicted, one or more of the devices 101, such as the device 101-1, may comprise a dispatch terminal of the dispatch computing device 158, and be communicatively coupled to the infrastructure controller 156 (e.g. not via the infrastructure RAN 152) via the dispatch computing device 158 (as depicted) not via the dispatch computing device 158. The infrastructure controller 156 further couples the devices 101 to an analytical computing device 162, for example via an internet protocol (IP) network (not depicted, but represented by lines there between), and the like.

The infrastructure RAN 152 may include one or more fixed antennas, fixed terminals, and the like (not depicted) which couple the infrastructure RAN 152 to the infrastructure controller 156 (e.g., a radio controller, call controller, push-to-talk (PTT) server, zone controller, mobility management entity (MME), base station controller (BSC), mobile switching center (MSC) device, site controller, push-to-talk controller, or other network device) the dispatch computing device 158 and the analytical computing device 162. In other examples, a plurality of fixed antennas and/or terminals and additional controllers may be disposed to support a larger geographic footprint and/or a larger number of mobile devices (e.g. a larger number of communication devices 101).

The infrastructure controller 156 illustrated in FIG. 1, or some other back-end infrastructure device or combination of back-end infrastructure devices existing on-premises or in a remote cloud compute cluster accessible via an IP network (such as the Internet), may additionally or alternatively operate as a back-end electronic digital assistant, a back-end audio and/or video processing device, and/or a remote cloud-based storage device.

It is understood by a person of skill in the art in FIG. 1 that an IP network is present which couples the infrastructure controller 156 to the analytical computing device 162, as well as one or more databases 163 as described in more detail below. Such an IP network may comprise one or more routers, switches, local area networks (LANs), wireless local area networks (WLANs), wide area networks (WANs), access points, or other network infrastructure, including but not limited to, the public Internet.

The analytical computing device 162 may comprise one computing device, and/or a plurality of computing devices in a cloud compute cluster arrangement, one or more of which may be executing none, all, or a portion of an electronic digital assistant service, sequentially or in parallel, across the one or more computing devices. The one or more computing devices comprising the analytical computing device 162 may be geographically co-located or may be separated by inches, meters, kilometers or miles, and interconnected via electronic and/or optical interconnects. Although not shown in FIG. 1, one or more proxy servers or load balancing servers may control which one or more computing devices perform any part or all of the electronic digital assistant service.

As depicted, the system 100 further comprises the one or more databases 163 accessible to the analytical computing device 162 via an IP network and/or the devices 101, and may include databases such as a long-term video storage database, an offender database (which may include, but is not limited to, facial recognition images to match against), a databases of subjects of interest, a database of candidate subjects, a database of object classifiers, a database of amber alerts, or other types of databases. The databases 163 may further include all or a portion of the databases described herein as being provided at the infrastructure controller 156. Furthermore, one or more of the databases 163 may further store logs of queries to one or more of the databases 163.

The databases 163 may include other types of databases including, but not limited to cartographic database of streets and elevations, a historical or forecasted weather database, a traffic database of historical or current traffic condition. In some example embodiments, the databases 163 may be maintained by third parties (for example, the National Weather Service or a Department of Transportation, respectively).

Furthermore, one or more of the databases 163 may alternatively be referred to as a cloud repository device and/or a cloud repository as data stored at one or more of the databases 163 may be stored "in the cloud".

As shown in FIG. 1, the databases 163 may be communicatively coupled with the analytical computing device 162 and/or the infrastructure RAN 152 (e.g. via an IP network) to allow the analytical computing device 162 and/or the devices 101 to communicate with and retrieve data from the databases 163, for example via an IP network and/or via the infrastructure controller 156. In some example embodiments, the databases 163 are commercial cloud-based storage devices. In some example embodiments, the databases 163 are housed on suitable on-premises database servers. The databases 163 of FIG. 1 are merely examples. In some example embodiments, the system 100 additionally or alternatively includes other databases that store different information. In some example embodiments, the databases 163 disclosed herein and/or additional or other databases are integrated with, or internal to, the infrastructure controller 156. For convenience, the one or more databases 163 are interchangeably referred to hereafter as the database 163.

In particular, as depicted in FIG. 1, the database 163 comprises a memory which stores historical biometric data 170 indicative of stress for a given user 103 that participates in talkgroups. For example, as depicted, the historical biometric data 170 comprises identifiers 171-1, 171-2, 171-3 . . . 171-N of each the users 103, interchangeably referred to hereafter, collectively, as the identifiers 171 and, generically, as an identifier 171 (and each labelled as "USER ID-#". Each identifier 171 identifies a respective user 103 and may comprise a numerical identifier, such as an employee number and/or badge number, and/or an alphanumerical alias (e.g. a natural language "name"), and the like. For example, the identifier 171-1 (e.g. "USER ID-1") may identify the user 103-1, the identifier 171-2 (e.g. "USER ID-2") may identify the user 103-2, etc.

Furthermore, the historical biometric data 170 further comprises respective historical biometric data 172-1, 172-2, 172-3 . . . 172-M, interchangeably referred to hereafter, collectively, as historical biometric data 172 and, generically, as a respective set of historical biometric data 172. The respective historical biometric data 172 are stored in association with each of the identifiers 171. Associations between data stored at the database 163 is depicted using dotted lines. Hence, the historical biometric data 172-1 is associated with the user 103-1 identified by the identifier 171-1, the historical biometric data 172-2 is associated with the user 103-2 identified by the identifier 171-2, etc.

In particular, the historical biometric data 170, and/or each respective set of historical biometric data 172 comprises data indicative of stress of a respective user 103; for example, the users 103 may be equipped with biometric sensors (described below), such as heart rate monitors, and the like, and data from the biometric sensors may be uploaded to the databases 163 for storage in association with the identifiers 171. Alternatively, and/or in addition to, one or more devices of the system 100 may be configured to monitor and analyze voice patterns of the users 103 when they are participating in talkgroups, for example to determine when the users 103 are stressed, and upload such analysis and/or voice patterns and/or voice data to the one or more databases 163, However, the historical biometric data 170, and/or each respective set of historical biometric data 172 may comprise any suitable biometric data for each user 103 identified by the identifiers 17 including, but not limited to, heart rate, blood pressure, skin resistivity, electrodermal responses, voice data, and the like.

Furthermore, while the historical biometric data 170 includes a set of historical biometric data 172 for each of the total number "N" of the users 103, the historical biometric data 170 may include historical biometric data 172 for fewer than the total number "N" of the users 103; for example, historical biometric data 170 may include historical biometric data 172 only for users 103 who are also dispatchers.

Furthermore, the database 163 may store identifiers of the devices 101, as well as associations therebetween (e.g. to indicate the devices 101 that are presently assigned to given users). In these examples, the user identifiers 171 may be associated with a respective device identifier of a device 101 that a user 103 is logged into and/or associated with.

Furthermore, the database 163 may store roles of users of the devices 101, for example a role and/or rank in a hierarchy, such as an organizational hierarchy of the users 103 (e.g. captains, patrol officers, dispatchers, etc.). In these examples, the user identifiers 171 may be associated with a respective role and/or rank of a user 103.

Furthermore, the database 163 may store locations of the devices 101 at least when communicating on the talkgroups identified by the identifiers 171; for example, each of the devices 101 may comprise a respective Global Positioning System (GPS) unit, and the like, and periodically report their current location to a location server (not depicted), which may store the locations in the database 163.

Furthermore, each respective set of historical biometric data 172 may be time stamped to show a time and/or date of occurrence of when stress occurred for a user 103 and/or historical biometric data 172 may be stored only for a given time period.

Furthermore, the historical biometric data 172 may be updated periodically and/or continuously as communications in the talkgroups occur by one or more of the devices 101, the infrastructure controller 156, and/or any other device of the system 100 that may be communicating in the talkgroups and/or managing the talkgroups.

Attention is next directed to FIG. 2 which depicts example embodiments of the devices 101. While the devices 101 of FIG. 2 are described with respect to a user 103 (as depicted, a police officer), a given device 101 may be adapted for use by a dispatcher, such as the device 101-1 being operated by the user 103-1.

As depicted in FIG. 2, a user 103 (as depicted, a police officer) is operating and/or wearing and/or is associated with a plurality of devices which form a personal area network 221 including, but not limited to: a primary battery-powered portable radio 227, a battery-powered radio speaker microphone (RSM) video capture device 228 (which includes a push-to-talk (PTT) switch 229, a display screen 230 and a video camera 234 and a microphone 235 (which is understood by a person of skill in the art to be a component of a speaker/microphone assembly), a laptop 236 (which may include an integrated video camera and/or microphone and/or speaker and used for data applications such as incident support applications), smart glasses 237 (e.g. which may be virtual reality, augmented reality, or mixed reality glasses and which may include an integrated video camera and/or microphone and/or speaker), a sensor-enabled holster 238, and/or a biometric sensor wristband 239. While not depicted, the personal area network 221 may include other types of devices that include sensors, such as a sensor equipped vest worn by the user 103 which may be configured to detect when the vest is impacted and/or pierced.

In particular, the biometric sensor wristband 239 may comprise a device that generates the historical biometric data 172. For example, data from the biometric sensor wristband 239 may be uploaded periodically to the databases 163 for storage as the historical biometric data 172 in association with an identifier 171 of the user 103 depicted in FIG. 2. Furthermore, the biometric sensor wristband 239 may be used to measure current stress of the user 103 wearing the biometric sensor wristband 239.

Indeed, when the user 103 depicted in FIG. 2 is a dispatcher (e.g. not a police officer. as depicted), the user 103 may not be wearing all the devices depicted in FIG. 2; rather the dispatcher may be wearing the biometric sensor wristband 239 which periodically uploads biometric data to the databases 163.

One or more of the devices 101 may comprise one or more of the devices of the personal area network 221, such as the portable radio 227 which may act as the communication hub for the personal area network 221.

As depicted, the personal area network 221 is in communication with a vehicle area network 248 of a vehicle 252 via a communication link 253, which may be wireless and/or wired as desired. The vehicle 252 is equipped with a plurality of devices which form the vehicle area network 248 including, but not limited to: a mobile communication device 254, a respective vehicular video camera 255 and/or microphone 256, and coupled vehicular transceiver 257, as well as a speaker 258.

Hence, for example, one or more of the devices 101 may have a configuration similar to the devices of the personal area network 221 and/or the vehicle area network 248. Indeed, the devices 101 may include other types of body worn cameras such as head-mounted cameras, other types of vehicular cameras such as roof-mounted cameras, or other types of audio and/or video recording devices.

Furthermore, one or more of the speakers of the devices depicted in FIG. 2, comprise a speaker over which audio from at least a talkgroup, in which the devices of FIG. 2 are participating is played, to convey the audio to the user 103 depicted in FIG. 2. Similarly, one or more of the microphones of the devices depicted in FIG. 2 comprise a microphone, over which audio is received from the user 103 depicted in FIG. 2 and conveyed to other devices 101 participating in the talkgroup.

Although FIG. 1, together with FIG. 2, describes a communication system 100 generally as a public safety communication system that includes responders, such as the user 103, generally described as a police officer and police vehicles, such as the vehicle 252 generally described as a police car or cruiser, in other example embodiments, the communication system 100 may additionally or alternatively be a retail communication system including users that may be employees of a retailer and vehicles that may be vehicles for use by the employees of the retailer in furtherance of the employees' retail duties (e.g., a shuttle or self-balancing scooter). In other example embodiments, the communication system 100 may additionally or alternatively be a warehouse communication system including users that may be employees of a warehouse and vehicles that may be vehicles for use by the employees of the warehouse in furtherance of the employees' retail duties (e.g., a forklift). In still further example embodiments, the communication system 100 may additionally or alternatively be a private security communication system including responders that may be employees of a private security company and vehicles that may be vehicles for use by the employees of the private security company in furtherance of the private security employees' duties (e.g., a private security vehicle or motorcycle). In even further example embodiments, the communication system 100 may additionally or alternatively be a medical communication system including users that may be doctors or nurses of a hospital and vehicles that may be vehicles for used in furtherance of the doctor or nurse's duties (e.g., a medical gurney or ambulance). In still another example embodiment, the communication system 100 may additionally or alternatively be a heavy machinery communication system including users that may be miners, drillers, or extractors at a mine, oil field, or precious metal or gem field and vehicles that may be vehicles used in furtherance of the miners', drillers', or extractors' duties (e.g., an excavator, bulldozer, crane, front loader). As one other example, the communication system 100 may additionally or alternatively be a transportation logistics communication system including users that may be bus drivers or semi-truck drivers at a school or transportation company and vehicles that may uses in furtherance of the drivers' duties.

Attention is next directed to FIG. 3 which sets forth a schematic diagram that illustrates an example device 301. One or more of the devices 101 and/or the dispatch computing device 158 and/or the infrastructure controller 156 and/or the analytical computing device 162 may have a configuration similar to the example communication device 301.

As depicted in FIG. 3, the example device 301 generally includes a communication unit 302, a processing unit 303, a Random Access Memory (RAM) 304, a display screen 305, an input device 306, one or more wireless transceivers 308, one or more wired and/or wireless input/output (I/O) interfaces 309, a combined modulator/demodulator 310, a code Read Only Memory (ROM) 312, a common data and address bus 317, a controller 320, a static memory 322 storing one or more applications 323, a speaker 328, an imaging device 332, a microphone 333 and a GPS unit 334. The one or more applications 323 will be interchangeably referred to hereafter as the application 323, though different applications 323 may be used for different modes of the device 301, as described in further detail below.

However, while the device 301 is described with respect to including certain components, it is understood that the device 301 may be configured according to the functionality of a specific device.

For example, as depicted, the device 301 may represents the devices 101 described above with respect to FIG. 1, and depending on the type of the device 101, the device 301 of FIG. 3 may include fewer or additional components in configurations different from that illustrated in FIG. 3.

For example, the device 301 acting as a fixed communication device 101 may not include one or more of the display screen 305, the input device 306, the speaker 328, the microphone 333, and the GPS unit 334 and/or one or more of such components may be located external to the device 301.

Similarly, the device 301 acting as a computing device, such as the dispatch computing device 158 and/or the infrastructure controller 156 and/or the analytical computing device 162 may not include one or more of the display screen 305, the input device 306, the speaker 328, the microphone 333, and the GPS unit 334 and/or one or more of such components may be located external to the device 301.

The example device 301 is described hereafter in further detail. As shown in FIG. 3, the device 301 includes the communication unit 302 coupled to the common data and address bus 317 of the processing unit 303. The device 301 may also include one or more input devices 306 (e.g., keypad, pointing device, touch-sensitive surface, etc.) and the display screen 305 (which, in some example embodiments, may be a touch screen and thus also act as an input device 306), each coupled to be in communication with the processing unit 303.

The speaker 328 may be present for reproducing audio that is decoded from voice or audio streams of calls received via the communication unit 302 from other portable radios, from digital audio stored at the device 301, from other ad-hoc or direct mode devices, and/or from an infrastructure RAN device, or may play back alert tones or other types of pre-recorded audio.

The imaging device 332 may provide video (still or moving images) of an area in a field of view of the device 301 for further processing by the processing unit 303 and/or for further transmission by the communication unit 302.

The microphone 333 may be present for capturing audio from a user and/or other environmental or background audio that is further processed by the processing unit 303 and/or is transmitted as voice or audio stream data, or as acoustical environment indications, by the communication unit 302 to other portable radios and/or other communication devices.

The processing unit 303 may include the code Read Only Memory (ROM) 312 coupled to the common data and address bus 317 for storing data for initializing system components. The processing unit 303 may further include the controller 320 coupled, by the common data and address bus 317, to the Random-Access Memory (RAM) 304 and a static memory 322.

The communication unit 302 may include one or more wired and/or wireless input/output (I/O) interfaces 309 that are configurable to communicate with other communication devices, such as others of the devices 101 and/or the dispatch computing device 158 and/or the analytical computing device 162.

For example, the communication unit 302 may include one or more wireless transceivers 308, such as a digital mobile radio (DMR) transceiver, a Project 25 (P25) transceiver, a terrestrial trunked radio (TETRA) transceiver, a Bluetooth transceiver, a Wi-Fi transceiver, for example operating in accordance with an IEEE 802.11 standard (e.g., 802.11a, 802.11b, 802.11g), an LTE transceiver, a Worldwide Interoperability for Microwave Access (WiMAX) transceiver, for example operating in accordance with an IEEE 802.16 standard, and/or another similar type of wireless transceiver configurable to communicate via a wireless radio network.

The communication unit 302 may additionally or alternatively include one or more wireline transceivers 308, such as an Ethernet transceiver, a USB transceiver, or similar transceiver configurable to communicate via a twisted pair wire, a coaxial cable, a fiber-optic link, or a similar physical connection to a wireline network. The transceiver 308 is also coupled to a combined modulator/demodulator 310.

The controller 320 may include ports (e.g. hardware ports) for coupling to the display screen 305, the input device 306, the imaging device 332, the speaker 328 and/or the microphone 333.

The controller 320 includes one or more logic circuits, one or more processors, one or more microprocessors, one or more ASIC (application-specific integrated circuits) and one or more FPGA (field-programmable gate arrays), and/or another electronic device. In some example embodiments, the controller 320 and/or the device 301 is not a generic controller and/or a generic device, but a device specifically configured to implement functionality for adjusting volume on talkgroups. For example, in some example embodiments, the device 301 and/or the controller 320 specifically comprises a computer executable engine configured to implement specific functionality for adjusting volume on talkgroups.

The static memory 322 is a machine readable medium that stores machine readable instructions to implement one or more programs or applications. Example machine readable media include a non-volatile storage unit (e.g. Erasable Electronic Programmable Read Only Memory ("EEPROM"), Flash Memory) and/or a volatile storage unit (e.g. random-access memory ("RAM")). In the example embodiment of FIG. 3, programming instructions (e.g., machine readable instructions) that implement the functional teachings of the device 301 as described herein are maintained, persistently, at the memory 322 and used by the controller 320 which makes appropriate utilization of volatile storage during the execution of such programming instructions.

In particular, the memory 322 stores instructions corresponding to the application 323 that, when executed by the controller 320, enables the controller 320 to implement functionality for adjusting volume on talkgroups. In illustrated examples, when the controller 320 executes the application 323, the controller 320 is enabled to: determine that a given user 103 is communicating in a talkgroup that includes a plurality of participants different from the given user 103, the controller 320 having access to a memory (e.g. the databases 163) storing the historical biometric data 172 indicative of stress for the given user that participates in talkgroups; and when a comparison of current biometric data of the given user 103 with the historical biometric data 172 indicates that the given user 103 is in a stressed state: differentially increase volume, in the talkgroup, of one participant, of the plurality of participants, relative to other participants of the plurality of participants, based on context data of one or more of the talkgroup and the plurality of participants.

Indeed, the example device 301 differentially increases volume, in the talkgroup, of one participant, of the plurality of participants, relative to other participants of the plurality of participants, based on context data of one or more of the talkgroup and the plurality of participants, using one or more machine learning algorithms which may include, but are not limited to: a generalized linear regression algorithm; a random forest algorithm; a support vector machine algorithm; a gradient boosting regression algorithm; a decision tree algorithm; a generalized additive model; neural network algorithms; deep learning algorithms; evolutionary programming algorithms; Bayesian inference algorithms, reinforcement learning algorithms, and the like.

However, generalized linear regression algorithms, random forest algorithms, support vector machine algorithms, gradient boosting regression algorithms, decision tree algorithms, generalized additive models, and the like may be preferred over neural network algorithms, deep learning algorithms, evolutionary programming algorithms, and the like, in some public safety environments. However, any suitable machine learning algorithm is within the scope of present implementations.

Hence, the application 323 may include the one or more machine learning algorithms.

Furthermore, different applications 323 may correspond to different machine learning algorithms, and/or different modes of the device 301. For example, different combinations of one or more different machine learning algorithms may be executed depending on a preconfigured and/or selected mode of the device 301.

Similarly, while present example embodiments are described with respect to the example device 301 differentially increasing volume, in the talkgroup, of one participant, of the plurality of participants, relative to other participants of the plurality of participants, based on context data of one or more of the talkgroup and the plurality of participants, such functionality may be at least partially performed by one or more of the devices 101, the infrastructure controller 156, the dispatch computing device 158, the analytical computing device 162 and/or a combination thereof. In other words, the functionality of the system 100 and/or the device 301 may be distributed among a plurality of devices of the system 100.

Indeed, such functionality (and/or the application 323) may also be at least partially embodied in the form of the electronic digital assistant, which may be located at one or more of (and/or distributed between one or more of) the device 301, the devices 101, the infrastructure controller 156, the analytical computing device 162, the device 301 and a combination thereof.

Indeed, the specific action that occurs at the device 301 when adjusting volume in a talkgroup may depend on a mode of the device 301, which may be selected using a menu system at the device 301, for example using the input device 306. Alternatively, a mode of the device 301 may be permanently and/or at least temporarily configured at the device 301. Alternatively, a system administrator may control the mode of the device 301. Furthermore, different applications 323 may be selected for execution by the controller 320 depending on the mode of the device 301.

Figure 4:
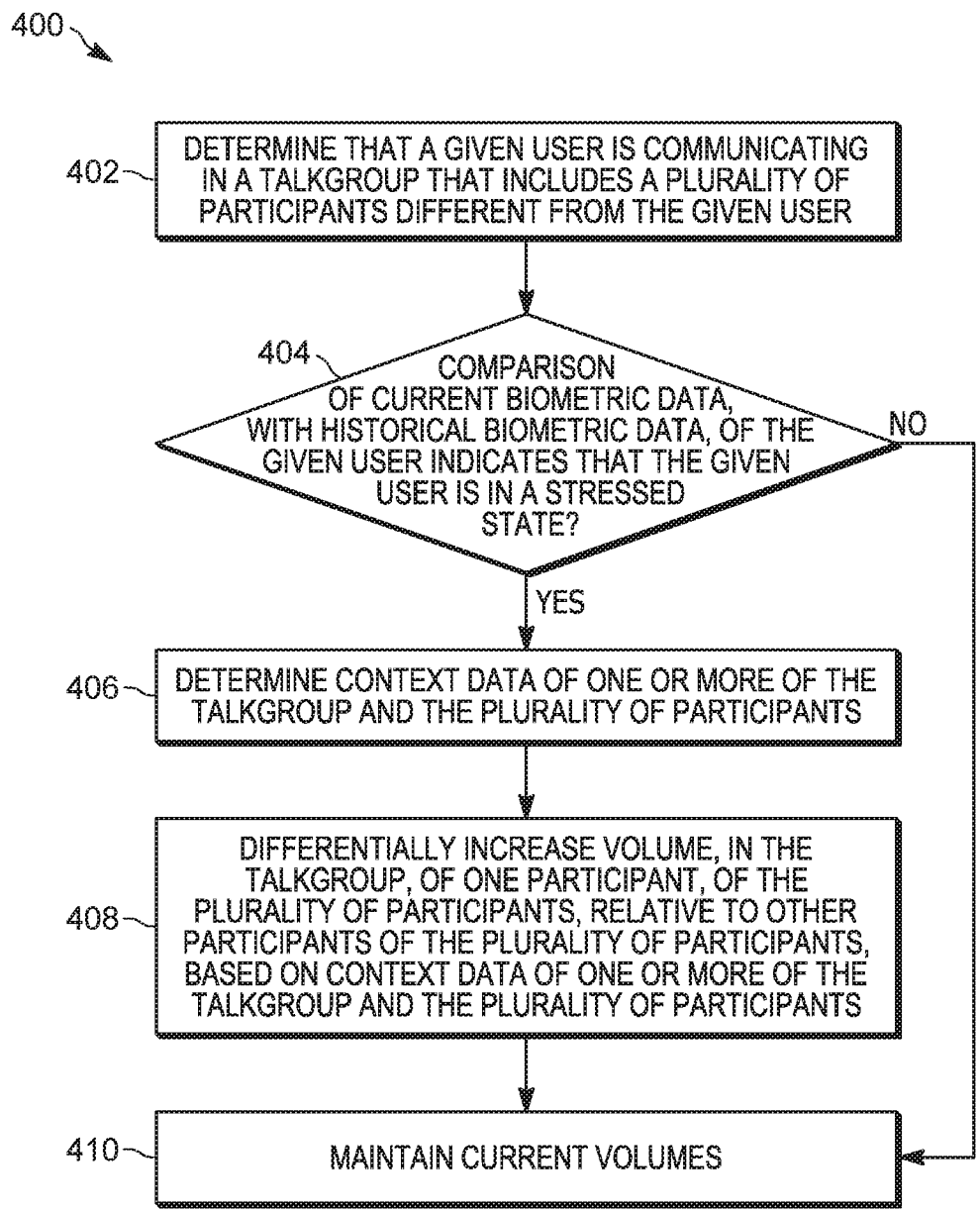
FIG. 4 depicts a flowchart of a method for adjusting volume on talkgroups in accordance with some embodiments.

Attention is now directed to FIG. 4 which depicts a flowchart representative of a method 400 for adjusting volume on talkgroups. The operations of the method 400 of FIG. 4 correspond to machine readable instructions that are executed by, for example, the example computing device 301, and specifically by the controller 320 of the example computing device 301. In the illustrated example, the instructions represented by the blocks of FIG. 4 are stored at the memory 322 for example, as the application 323. The method 400 of FIG. 4 is one way in which the controller 320 and/or the example computing device 301 and/or the system 100 is configured. Furthermore, the following discussion of the method 400 of FIG. 4 will lead to a further understanding of the system 100, and its various components. However, it is to be understood that the method 400 and/or the system 100 may be varied, and need not work exactly as discussed herein in conjunction with each other, and that such variations are within the scope of present example embodiments.

The method 400 of FIG. 4 need not be performed in the exact sequence as shown and likewise various blocks may be performed in parallel rather than in sequence. Accordingly, the elements of method 400 are referred to herein as "blocks" rather than "steps." The method 400 of FIG. 4 may be implemented on variations of the system 100 of FIG. 1, as well.

Furthermore, while it is understood by a person of skill in the art hereafter that the method 400 is performed at the device 301, the method 400 may be performed at one or more of the devices of the system 100, for example at a combination of one or more of the devices 101, the infrastructure controller 156, the dispatch computing device 158, and/or the analytical computing device 162, etc.

At a block 402, the controller 320 of the device 301 determines that a given user 103 is communicating in a talkgroup that includes a plurality of participants different from a given user 103. For example, a given user 103 may be the user 103-1 and/or a dispatcher, while the plurality of participants different from the given user 103 may be the other users 103-2, 103-3 . . . 103-N and/or a subset of the other users 103-2, 103-3 . . . 103-N, for example at least two of the other users 103-2, 103-3 . . . 103-N.

It is further understood by persons of skill in the art that the controller 320 of the device 301 may determine that a given user 103 is communicating in a talkgroup that includes a plurality of participants different from the given user 103 by receiving audio data (and/or video data) and/or a talkgroup affiliation request from a device 101 associated with the given user 103. The other plurality of participants may be determined in a similar manner.

Determination of the given user 103 may further include determining a respective user identifier 171 of the given user 103 and/or a determining a respective device identifier of a device 101 operated by, and/or associated with, the given user 103. For example, such a determination may enable the controller 320 to retrieve historical biometric data 172 of the given user 103 from the databases 163 based on the respective user identifier 171 and/or a respective device identifier.

At a block 404, the controller 320 of the device 301 determines whether a comparison of current biometric data of the given user 103 with the historical biometric data 172 of the given user 103 indicates that the given user 103 is in a stressed state. For example, the controller 320 of the device 301 may receive current biometric data of the given user 103 from a biometric sensor device worn by the given user 103, such as a biometric sensor wristband 239 worn by the given user 103. Alternatively, the controller 320 of the device 301 may analyze voice patterns of the given user 103, for example based on audio data of the given user 103 received when the given user 103 is participating in the talkgroup.

The controller 320 of the device 301 may further retrieve the historical biometric data 172 of the given user 103 from the databases 163 based on the respective user identifier 171 and/or a respective device identifier.

When the comparison of current biometric data of the given user 103 with the historical biometric data 172 of the given user 103 indicates that the given user 103 is in a stressed state (e.g. a "YES" decision at the block 404), at a block 406 the controller 320 of the device 301 determines context data for one or more of the talkgroup on which the given user 103 is communicating and the plurality of participants of the talkgroup.

The context data may include, but it is not limited to, one or more of: respective locations of one or more of the plurality of participants; a respective frequency of speaking of one or more of the plurality of participants; keywords spoken by one or more of the plurality of participants; a respective conversation with the given user 103 by one or more of the plurality of participants; a sequence of the respective conversation with the given user 103 by one or more of the plurality of participants; respective sensor data associated with one or more of the plurality of participants; and respective roles of one or more of the plurality of participants. Such context data is described in more detail below.

In some examples, the context data may be determined by retrieving roles and/or locations of users 103 who are participants in the talkgroup from the databases 163 using user identifiers 171 of the participants and/or device identifiers of the devices 101 of the participants in the talkgroup. In other examples, the context data may be determined by requesting locations of the participants in the talkgroup from the devices 101 of the participants in the talkgroup.

In some examples, the context data may be determined by monitoring communications of the talkgroup, for example by monitoring conversations and/or words and/or keywords spoken by the participants in the talkgroup to determine one or more of: respective frequency of speaking of the plurality of participants; keywords spoken by the plurality of participants; a respective conversation with the given user 103 by the plurality of participants; a sequence of the respective conversation with the given user 103 by the plurality of participants.

In yet further examples, the context data may be determined by querying the devices 101 for respective sensor data associated with the plurality of participants in the talkgroup from the devices 101, for example to determine whether a respective sensor-enabled holster 238 has generated sensor data indicative of a weapon being removed from the respective sensor-enabled holster 238 and the like.

Other types of context data are within the scope of the present specification.

At a block 408, the controller 320 of the device 301 differentially increases volume, in the talkgroup, of one participant, of the plurality of participants, relative to other participants of the plurality of participants, based on the context data of one or more of the talkgroup and the plurality of participants.

Otherwise, when the comparison of current biometric data of the given user 103 with the historical biometric data 172 of the given user 103 indicates that the given user 103 is not in a stressed state (e.g. a "NO" decision at the block 404), at a block 410, the controller 320 of the device 301 maintains current volumes on the talkgroup.

The determination of whether or not the given user 103 is in a stressed state may include comparing available current biometric data of the given user 103 with corresponding historical biometric data 172 of the given user 103.

For example, a determination of whether or not the given user 103 is in a stressed state may include determining that a heart rate of the given user 103 is above an average heart rate as indicated in the historical biometric data 172 of the given user 103 and/or that a heart rate of the given user 103 is above the average heart rate by a given amount, such as 10% higher, and the like. However, comparisons of any other type of current biometric data of the given user 103 with corresponding historical biometric data 172 of the given user 103 is within the scope of the present specification.

Furthermore, the differential increase of the volume of the one participant, relative to the other participants, may occur at least at a communication device 101 of the given user 103. For example, when the given user 103 is the given user 103-1 (e.g. a dispatcher), the device 101 of the given user 103 may be the device 101-1. Hence, the controller 320 may be further configured to differentially increase the volume of the one participant, relative to the other participants, at least at a communication device 101-1 of the given user 103-1; otherwise the volume of the one participant, relative to the other participants, may not change at the devices 101 of the plurality of participants different from the given user 103-1.

Furthermore, the controller 320 may differentially increase the volume of the one participant, relative to the other participants, by one or more of: increasing the volume of the one participant and lowering the volume of the other participants. In other words, the volume of the one participant may be increased while the volume of the other participants may stay the same and/or be lowered. Alternatively, the volume of the one participant may stay the same while the volume of the other participants may be lowered. Lowering of volume of the other participants may include, but is not limited to, muting the other participants.

Regardless, the controller 320 causes the volume of one participant of the talkgroup, different from the given user 103, such as a dispatcher, to be differentially increased, relative to the other participants, so that the given user 103, when in a stressed state, may focus on the audio of the one participant, as described in more detail hereafter.

For example, when the device 300 includes the device 101-1 and the given user includes the user 103-1, the controller 320 may differentially increase the volume of the one participant, relative to the other participants at the speaker 328, such that, for example, audio output volume of the speaker 328 is higher for the one participant than the other participants. Hence, when several participants are speaking at the same time, the output at the speaker 328 is higher for the one participant than the other participants. Hence, a person of skill in the art understands that differentially increasing the volume of the one participant, relative to the other participants in a talkgroup includes controlling a speaker (e.g. the speaker 328) at a receiving device 101 of the given user 103, the receiving device 101 receiving communications from transmitting devices 101. Furthermore, such differentially increasing the volume of the one participant, relative to the other participants may occur at the receiving device 101, for example via a controller and/or a processor (e.g. the controller 320) of the receiving device 101 controlling the volume at the speaker 328 by attenuating signals received from transmitting devices 101 encoded with voices of the other participants, and/or amplifying received from the transmitting device 101 encoded with voice of the one participant. Alternatively, such attenuating and amplifying of signals of the transmitting devices 101 may occur at the infrastructure controller 156, and the like.

Figure 5:
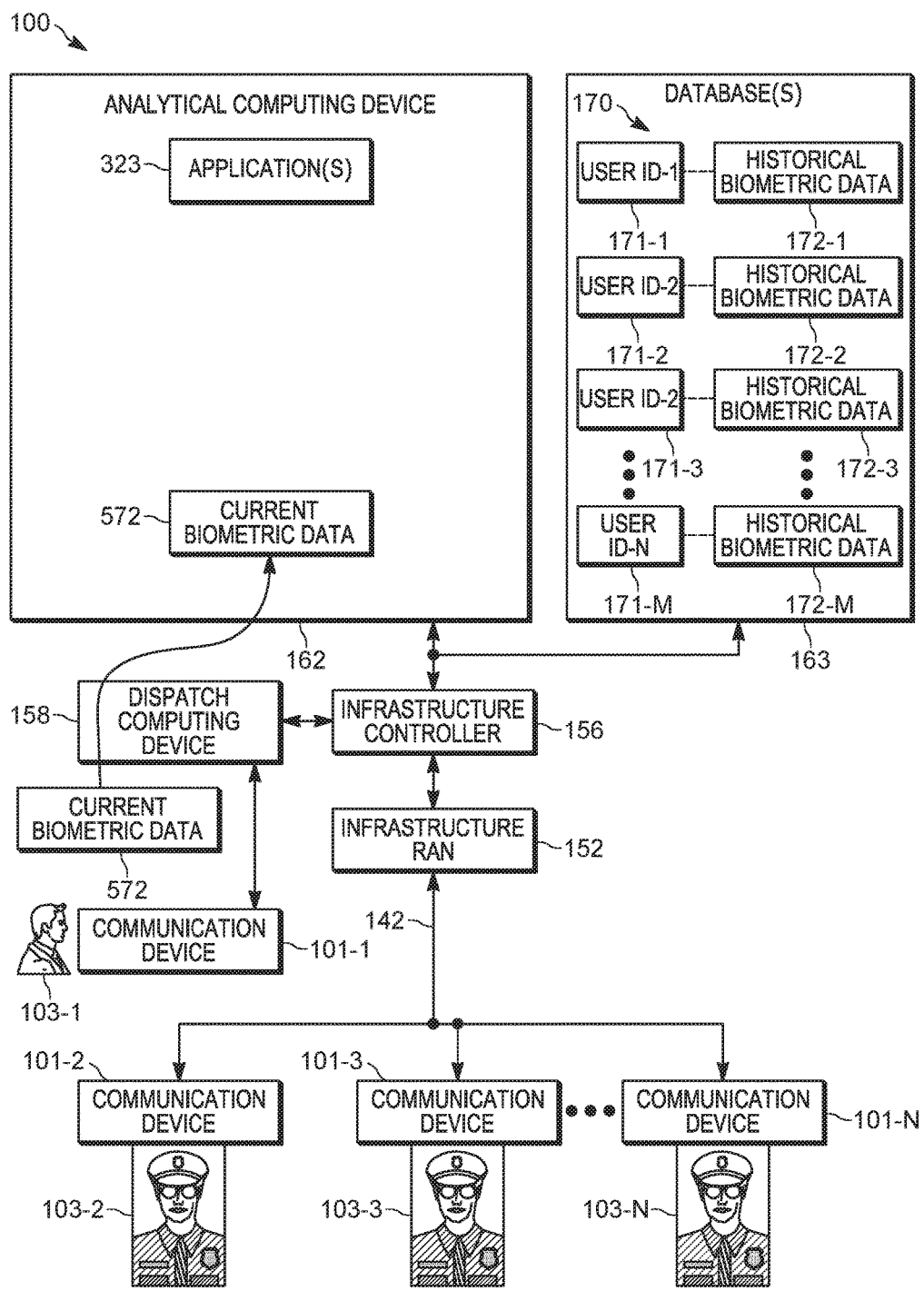
FIG. 5 depicts the system of FIG. 1 determining current biometric data of a given user in accordance with some embodiments.
Figure 6:
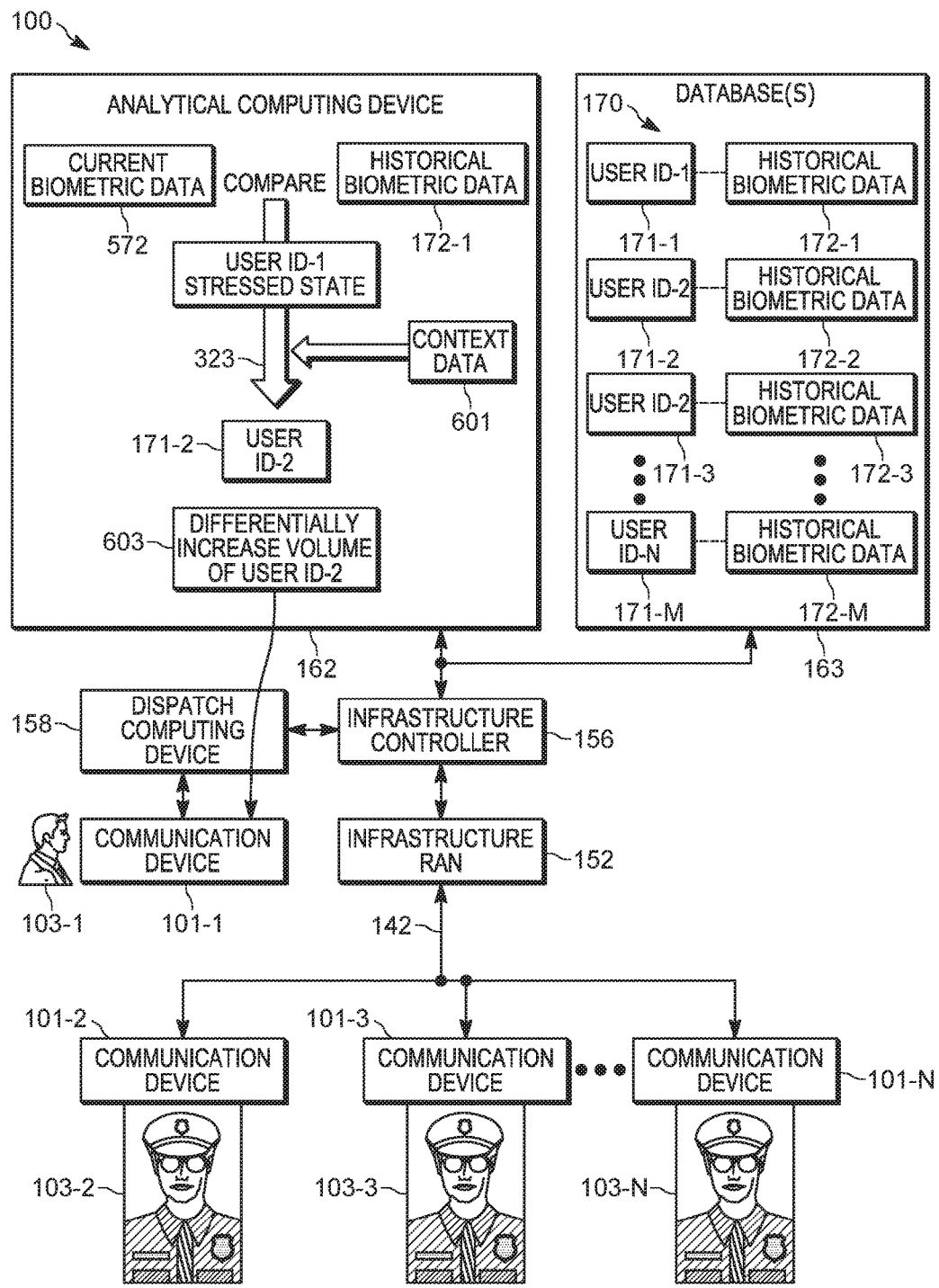
FIG. 6 depicts the system of FIG. 1 differentially increasing a volume of a participant in a talkgroup, when the given user is in a stressed state in accordance with some embodiments.

Attention is next directed to FIG. 5 and FIG. 6 which depicts an example of the method 400. Each of FIG. 5 and FIG. 6 are substantially similar to FIG. 1 with like elements having like numbers. In FIG. 5 and FIG. 6, the method 400 is described as being implemented at the analytical computing device 162; hence, in these example, the device 301, includes the analytical computing device 162. However, the method 400 may be implemented at a combination of the devices 101, the infrastructure controller 156, the dispatch computing device 158, the analytical computing device 162, and the like.

Furthermore, in FIG. 5 and FIG. 6, a person of skill in the art understands that all the users 103 may be participants in a talkgroup via respective devices 101 that are in communication on the talkgroup. For example, communications on the talkgroup may be exchanged between the devices 101 via the infrastructure controller 156 and the analytical computing device 162 may be configured to monitor the communications at the infrastructure controller 156 (and/or the method 400 may be at least partially implemented at the infrastructure controller 156).

Furthermore, the method 400 will be described with respect to determining whether the user 103-1 is in a stressed state (e.g. the user 103-1 being a given user 103). For example, in FIG. 5, current biometric data 572 of the user 103-1 is being transmitted to the analytical computing device 162 by the device 101-1 of the user 103-1. For example, the current biometric data 572 may include the heart rate of the user 103-1, measured using a biometric sensor wristband 239, and may be transmitted periodically and/or when the heart rate of the user 103-1 is above a given heart rate. As depicted, the current biometric data 572 is transmitted to the analytical computing device 162 via the dispatch computing device 158 and the infrastructure controller 156.

It is hence further understood by a person of skill in the art that, in FIG. 5, the analytical computing device 162 has determined, at the block 402 of the method 400, that the given user 103-1 is communicating in a talkgroup that includes a plurality of participants different from the given user 103, such as the other users 103-2, 103-3 . . . 103-N.

FIG. 6 depicts the analytical computing device 162 comparing (e.g. at the block 404 of the method 400) the current biometric data 572 of the user 103-1 with the historical biometric data 172-1 of the user 103-1 to determine, via the applications 323, that the user 103-1 (e.g. having a user identifier "USER ID-1") is in a stressed state. For example, a heart rate provided in the current biometric data 572 may be above an average heartrate provided in the historical biometric data 172-1. Hence, for example, a "YES" decision occurs at the block 404 of the method 400.

The analytical computing device 162 determines (e.g. at the block 406 of the method 400) context data 601 of one or more of the talkgroup and the plurality of participants of the talkgroup. Examples of the context data 601 are described in more detail below. However, in one example, the context data 601 may indicate that the user 103-2 is the most frequent speaker in the talkgroup.

Based on the context data 601, the analytical computing device 162 determines that the one participant of the talkgroup, of the plurality of participants, for which volume is to be differentially increased is the user 103-2 (e.g. as represented by the user identifier 171-2).

Hence, in the example, the analytical computing device 162 generates a command 603 to cause the volume of the user 103-2 to be differentially increased, relative to the other participants in the talkgroup, at least at the device 101-1 of the given user 103-1 who is in the stressed state. The command 603 is transmitted (e.g. at the block 408 of the method 400) to the device 101-1, via the infrastructure controller 156 and the dispatch computing device 158, to cause the device 101-1 to differentially increase the volume of the user 103-2, relative to the other participants in the talkgroup, for example by amplifying signals (e.g. at a speaker of the device 101-1) encoded with the voice of the user 103-2 received from the device 101-2 and/or by attenuating signals (e.g. at a speaker of the device 101-1) encoded with the voices of the users 103-3 . . . 103-N received from the devices 101-3 . . . 101-N. Alternatively, the command 603 may be transmitted to the infrastructure controller 156 which may amplify and/or attenuate the signals prior to being received at the device 101-1.

However, the volume of the user 103-2, relative to the other participants in the talkgroup, may be increased in any suitable manner.

Attention is next directed to FIG. 7 to FIG. 13, each of which depict the devices 101 and the associated users 103, all of whom are participants in a talkgroup 701, with the respective volumes of the participants in the talkgroup 701 being controlled by the device 301. Each of FIG. 7 to FIG. 16 depict a respective example of a mode of the device 301 when implementing the method 400 and/or the applications 323 when the given user 103-1 is in a stressed state. Hence, the device 301 is controlling volumes of the participants in the talkgroup 701 at least for the device 101-1 of the given user 103-1. Indeed, as depicted, the given user 103-1 comprises a dispatcher, and the other users 103-2, 103-3 . . . 103-N are police officers, and the like.

Furthermore, while in FIG. 7 to FIG. 13 various context data is depicted as adjacent various users 103, and as explained in more detail below, a person of skill in the art understands that the device 301 is monitoring such context data, either in the form of words and/or conversations spoken in the talkgroup 701 and/or as sensor data received via the infrastructure controller 156, and the like, and/or as retrieved from the databases 163.

Figure 7:
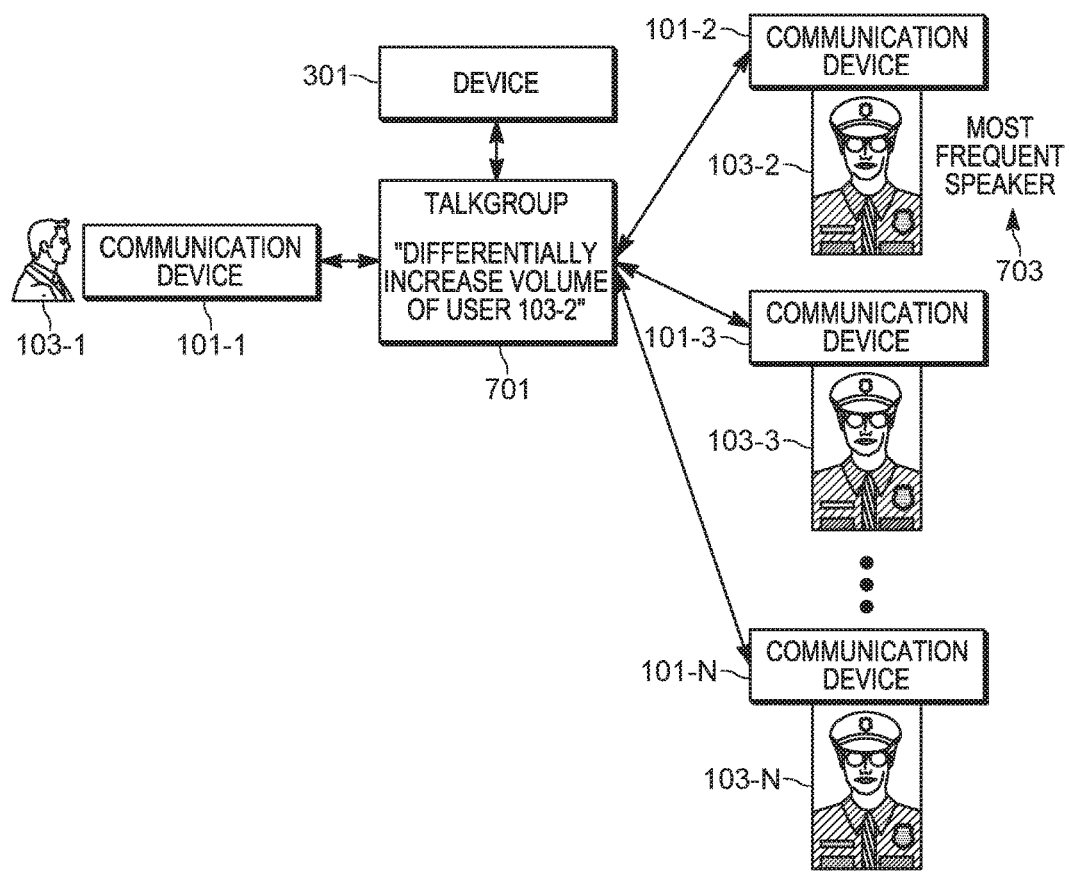
FIG. 7 depicts a volume of a most frequent speaker being differentially increased in a talkgroup in accordance with some embodiments.

Attention is next directed to FIG. 7 which depicts that the device 301 has determined context data 703 that indicates that the user 103-2 is the "Most Frequent Speaker". Hence, as indicated in the talkgroup 701, the volume of the user 103-2 has been differentially increased relative to the other users 103-3 . . . 101-N, at least at the device 101-1. Hence, in FIG. 7, the context data 703 includes a respective frequency of speaking of one or more of the plurality of participants in the talkgroup and the controller 320 of the device 301 is configured to determine which participant is the most frequent speaker.

Figure 8:
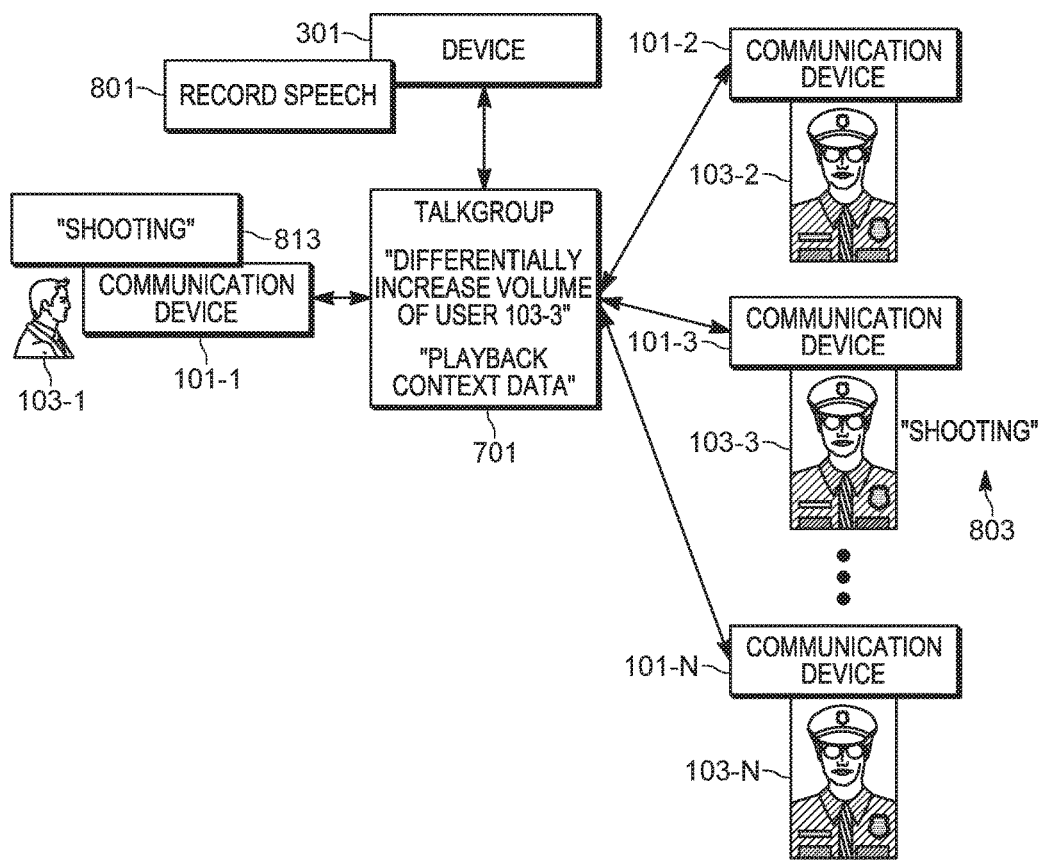
FIG. 8 depicts a volume of a speaker who says a keyword being differentially increased in a talkgroup in accordance with some embodiments.

Attention is next directed to FIG. 8 which depicts that the device 301 is recording speech 801 in the talkgroup 701 and has determined context data 803 that indicates that the user 103-3 has said a keyword "Shooting". Hence, as indicated in the talkgroup 701, the volume of the user 103-3 has been differentially increased relative to the other users 103-2, 103-N, at least at the device 101-1, and furthermore, at least a portion of the recorded speech 801 is played back 813 that includes the context data 803, for example, as depicted, the word "Shooting".

Hence, in these example embodiments, the controller 320 of the device 301 is further configured to: record speech 801 in the talkgroup 701, the speech 801 including the context data 803; and when the volume of one participant (e.g. the user 103-3) is differentially increased, play back 813 at least a portion of the recorded speech 801 of the one participant that includes the context data 803. Hence, in these examples, the device 301 may record the speech 801 in the talkgroup, for example in a buffer in the memory 322, and play back speech that includes context data 803 that includes a keyword. Such keywords may be stored at the memory 322 either in a database and/or as component of the application 323. Indeed, in these examples, the application 323 may include a speech to text module to determine when keywords are spoken in the talkgroup.

Hence, in the example of FIG. 8, the volume of the user 103-3 is differentially increased and the context data 803 including keywords is played back in the event that the user 103-1, who is stressed, may not have heard the keywords.

Furthermore, in these examples, the context data may include keywords spoken by one or more of the plurality of participants.

Figure 9:
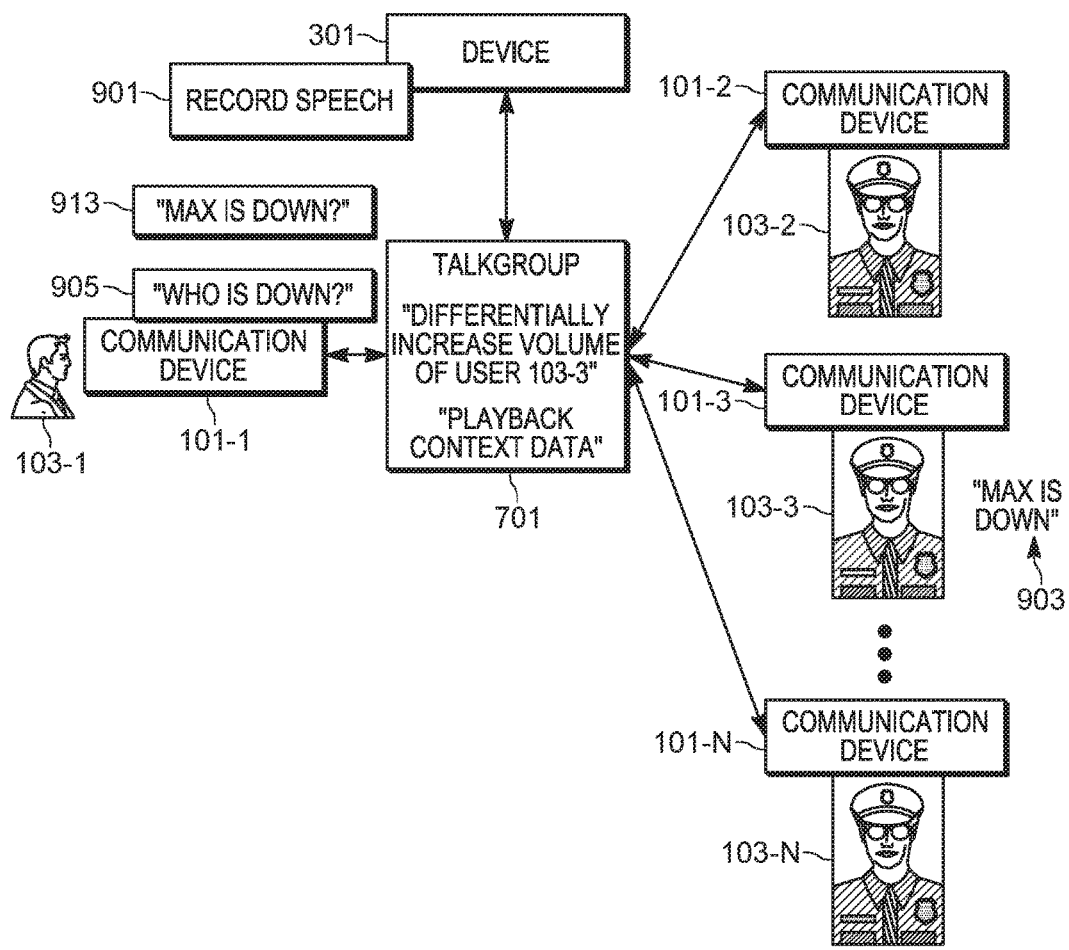
FIG. 9 depicts a volume of a speaker who responds to a question of the given user being differentially increased in a talkgroup in accordance with some embodiments.

Attention is next directed to FIG. 9 which depicts that the device 301 is recording speech 901 in the talkgroup 701 and has determined context data 903 that indicates that the user 103-3 has responded to a question 905 asked by the user 103-1, for example within a given time period. For example, as depicted, the user 103-1 has asked a question "WHO IS DOWN?" and the user 103-3 has responded within a given time period, such as within 2 seconds, and or any other suitable time period, with an answer "MAX IS DOWN".

Hence, as indicated in the talkgroup 701, the volume of the user 103-3 has been differentially increased relative to the other users 103-2, 103-N, at least at the device 101-1, and furthermore, at least a portion of the recorded speech 901 is played back 913 that includes the context data 903, for example, as depicted, the sentence "MAX IS DOWN".

Hence, in these example embodiments, similar to FIG. 8, the controller 320 of the device 301 is further configured to: record speech 901 in the talkgroup 701, the speech 901 including the context data 903; and when the volume of one participant (e.g. the user 10303) is differentially increased, play back 913 at least a portion of the recorded speech 901 of the one participant that includes the context data 903.

Furthermore, in these examples, the context data may include a conversation with the given user 103-1 by one or more of the plurality of participants in the talkgroup different from the given user 103-1. For example, the context data used to determine a participant whose speech is to be differentially increased may include both the context data 903 and the question 905.

Furthermore, in these examples, the context data may include a sequence of the respective conversation with the given user 103-1 by one or more of the plurality of participants; for example, when the given user 103-1 asks a question, the device 301 may determine which of the participants responds to the question within a given period of time.

Figure 10:
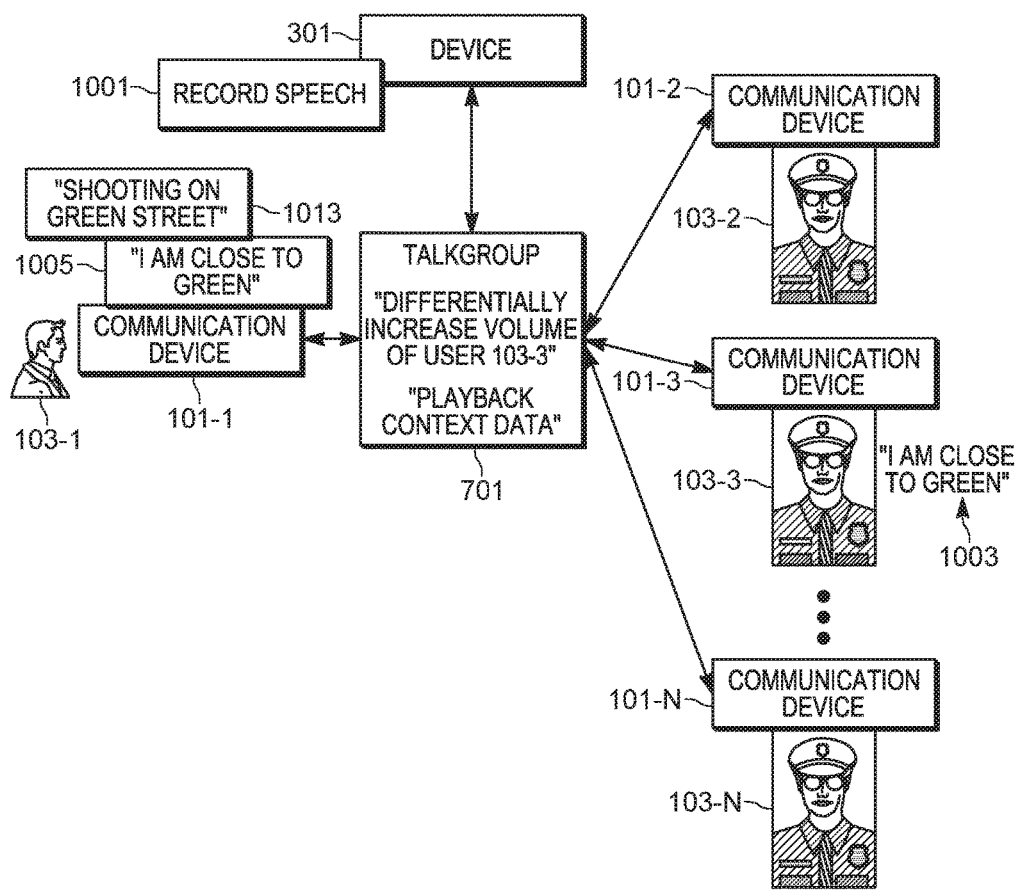
FIG. 10 depicts a volume of a speaker who responds to a statement made by the given user being differentially increased in a talkgroup in accordance with some embodiments.

Attention is next directed to FIG. 10 which depicts that the device 301 is recording speech 1001 in the talkgroup 701 and has determined context data 1003 that indicates that the user 103-3 has responded to a statement 1005 by the user 103-1, for example within a given time period. For example, as depicted, the user 103-1 has states "SHOOTING ON GREEN STREET" and the user 103-3 has responded within a given time period, such as within 2 seconds, and or any other suitable time period, with "I AM CLOSE TO GREEN". Alternatively, the device 301 may determine a user 103 that speaks words that are included in the statement 1005 (e.g. "GREEN").

Regardless, as indicated in the talkgroup 701, the volume of the user 103-3 has been differentially increased relative to the other users 103-2, 103-N, at least at the device 101-1, and furthermore, at least a portion of the recorded speech 1001 is played back 1013 that includes the context data 1003, for example, as depicted, the sentence "I AM CLOSE TO GREEN".

Hence, in these example embodiments, similar to FIG. 9, the controller 320 of the device 301 is further configured to: record speech 1001 in the talkgroup 701, the speech 1001 including the context data 1003; and when the volume of one participant (e.g. the user 10303) is differentially increased, play back 1013 at least a portion of the recorded speech 1001 of the one participant that includes the context data 1003.

Furthermore, in these examples, the context data may include a conversation with the given user 103-1 by one or more of the plurality of participants in the talkgroup different from the given user 103-1. For example, the context data used to determine a participant whose speech is to be differentially increased may include both the context data 1003 and the statement 1005.

Figure 11:
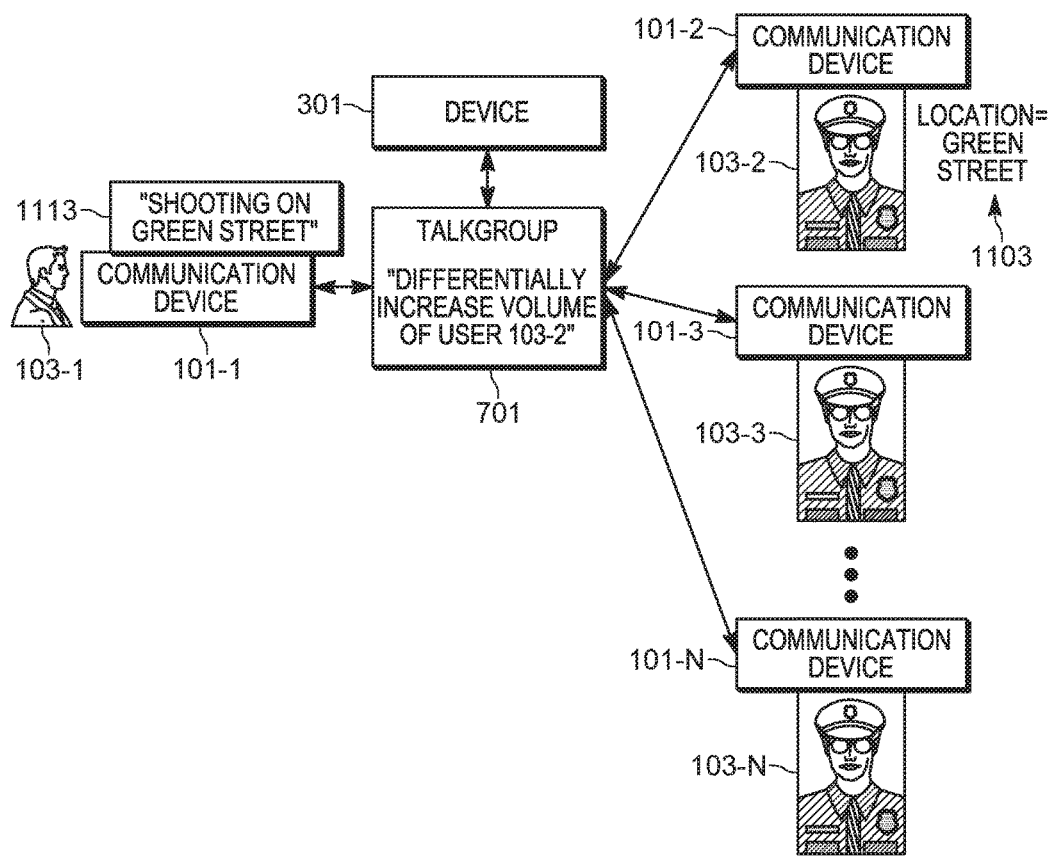
FIG. 11 depicts a volume of a speaker who is at a given location being differentially increased in a talkgroup in accordance with some embodiments.

Attention is next directed to FIG. 11 which depicts that the device 301 has determined context data 1103 that indicates that a location of the user 103-2 is "Green Street". For example, similar to FIG. 10, the given user 103-1 may make a statement 1113 "SHOOTING ON GREEN STREET", and the device 301 may determine which of the users 103-2, 103-3 . . . 103-N is located at, and/or near (e.g. within a given geofence), a location in the statement 1113. Furthermore, as indicated in the talkgroup 701, the volume of the user 103-2 has been differentially increased relative to the other users 103-3 . . . 101-N, at least at the device 101-1. Hence, in FIG. 11, the context data includes respective locations of one or more of the plurality of participants in the talkgroup 701.

Figure 12:
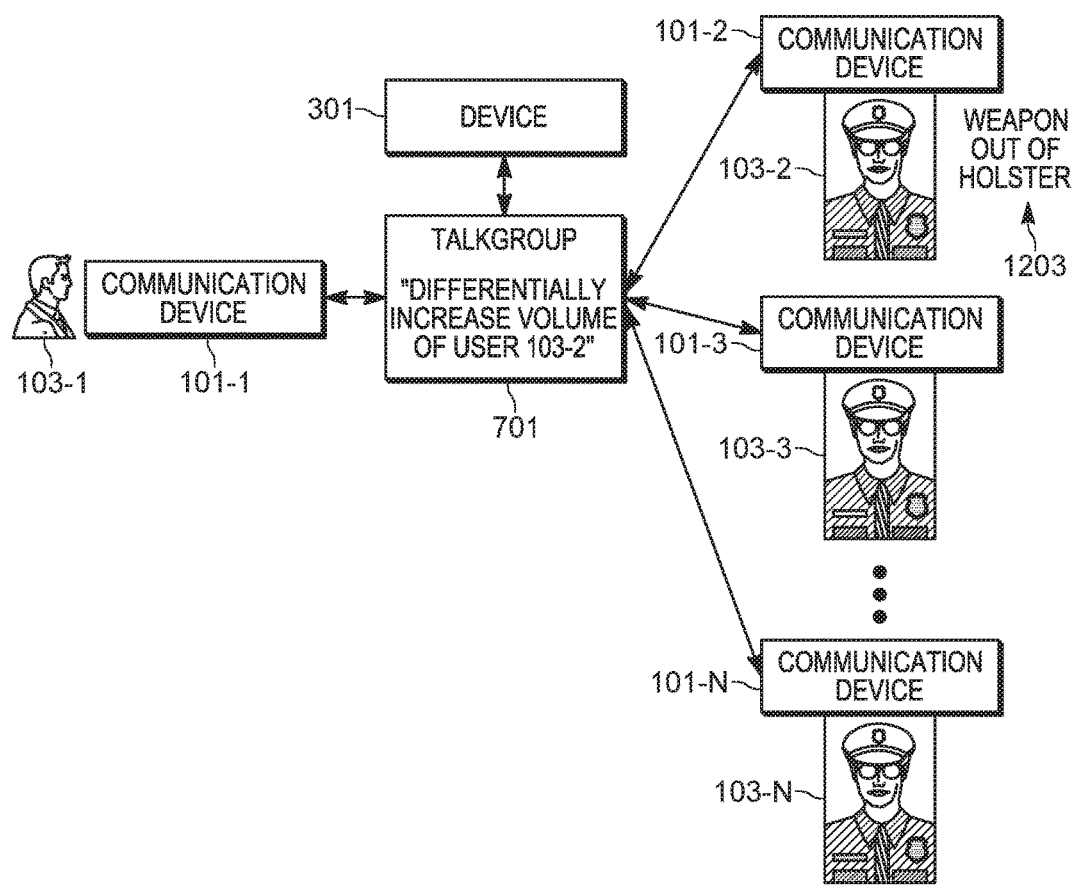
FIG. 12 depicts a volume of a speaker who has withdrawn a weapon from a holster being differentially increased in a talkgroup in accordance with some embodiments.

Attention is next directed to FIG. 12 which depicts that the device 301 has determined context data 1203 that indicates that weapon of the user 103-2 is out of a holster. Hence, as indicated in the talkgroup 701, the volume of the user 103-2 has been differentially increased relative to the other users 103-3 . . . 101-N, at least at the device 101-1. Hence, in FIG. 12, the context data 1203 includes respective sensor data associated with one or more of the plurality of participants, for example sensor data from a respective a sensor-enabled holster 238 of a user 103, such as the user 103-2.

Figure 13:
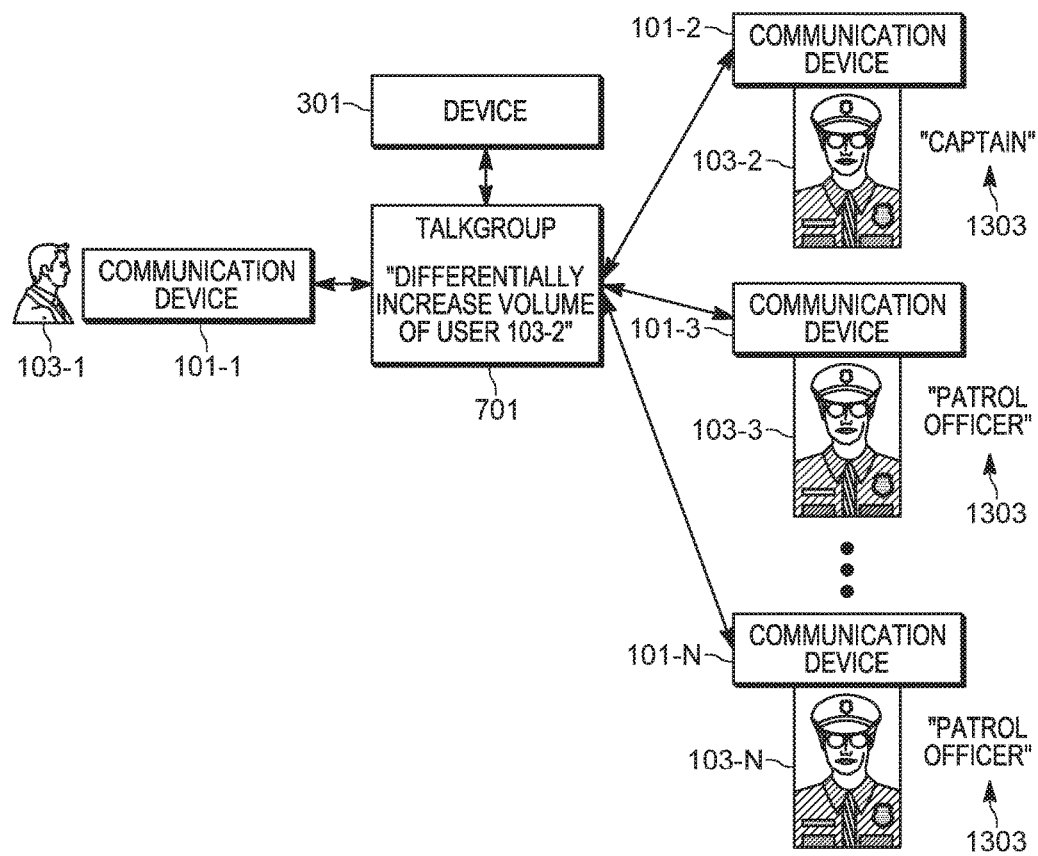
FIG. 13 depicts a volume of a speaker who of a given rank being differentially increased in a talkgroup in accordance with some embodiments.

Attention is next directed to FIG. 13 which depicts that the device 301 has determined context data 1303 that indicates that one of the participants in the talkgroup 701 has a role and/or a rank of a "CAPTAIN", whereas the roles and/or ranks of the other participants are lower than "CAPTAIN", for example, "PATROL OFFICER". Hence, as indicated in the talkgroup 701, the volume of the user 103-2 has been differentially increased relative to the other users 103-3 . . . 101-N, at least at the device 101-1. Hence, in FIG. 13, the context data 1303 includes respective roles and/or ranks of one or more of the participants in the talkgroup 701.

Figure 14:
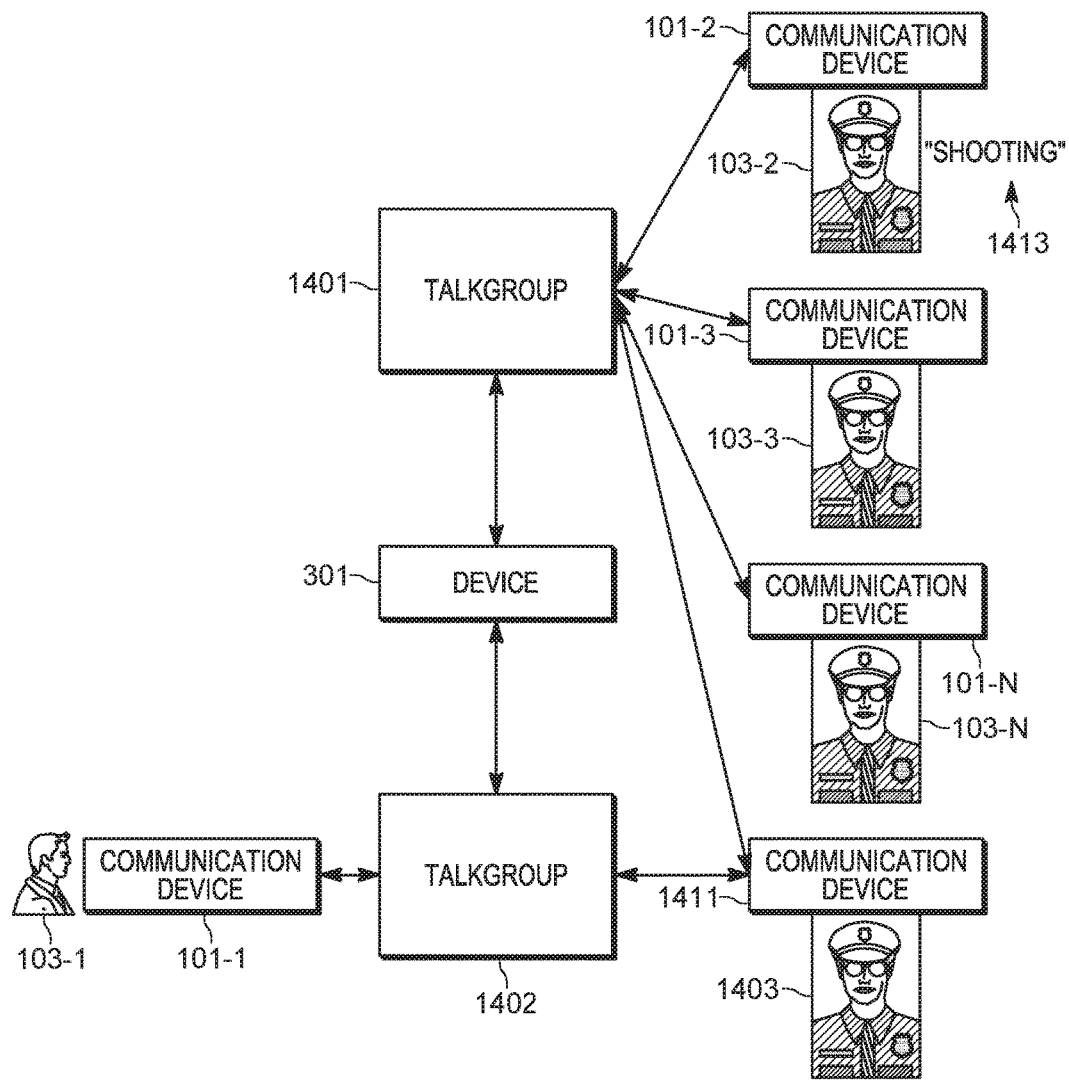
FIG. 14 depicts a speaker on a different talkgroup speaking a keyword in accordance with some embodiments.
Figure 15:
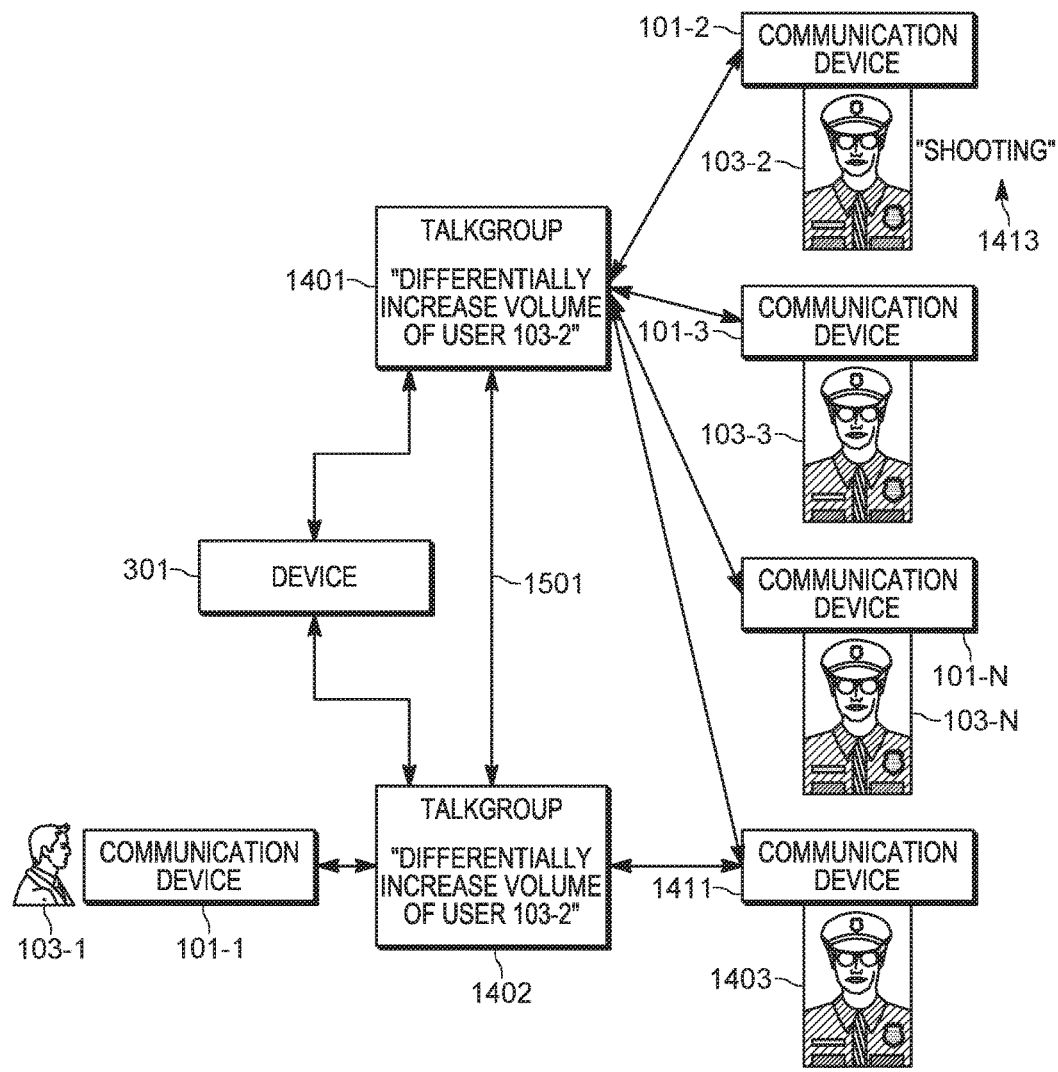
FIG. 15 depicts two talkgroups being linked when a speaker on one talkgroup says a keyword, the volume of the speaker being differentially increased in accordance with some embodiments

Attention is next directed to FIG. 14 and FIG. 15 which depicts that the device 301 is managing two talkgroups 1401, 1402, and are otherwise similar to FIG. 7 to FIG. 13. The talkgroup 1401 includes the users 103-2, 103-3 . . . 103-N, and a user 1403 associated with a communication device 1411 which is substantially similar to the devices 101, and may be a mobile communication device. The user 1403 may be a commander and/or a captain, and the like, of the users 103-2, 103-3 . . . 103-N. The talkgroup 1401 excludes, however, the given user 103-1 (e.g. the dispatcher is excluded). The talkgroup 1402 includes the user 1403 and given user 103-1, and excludes the users 103-2, 103-3 . . . 103-N.

The device 301 may further determined that the talkgroups 1401, 1402 are related as they include a common user 1403.

In FIG. 14, the device 301 has determined context data 1413 that indicates that one of the participants in the talkgroup 1402, and specifically the user 103-2 has said a keyword "Shooting". Hence, as depicted in FIG. 15, the device 301 links 1501 the talkgroups 1401, 1402 (e.g. merges the talkgroups 1401, 1402 and/or causes communications on both the talkgroups 1401, 1402 to be at least available to all the users 103, 1403. Furthermore, as indicated in the talkgroup 1401, 1402, the volume of the user 103-2 has been differentially increased relative to the other users 103-3 . . . 101-N, at least at the device 101-1. Indeed, in some examples, the volume of the other users 103-3 . . . 101-N may be muted in the talkgroup 1402, and the volume of the user 1403 may not be muted in the talkgroup 1402. Indeed, the differential volume of the users 103-2, 1403 may be the same in the talkgroup 1402, or the differential volume of the user 103-2 may be increased relative to the user 1403.

Hence, in the examples of FIG. 14 and FIG. 15, the controller 320 o the device 301 may be further configured to: link a related talkgroup 1401, with the talkgroup 1402, based on respective context data 1413 of a respective participant (e.g. the user 103-2) in the related talkgroup 1401; and differentially increase the respective volume of the respective participant, relative to one or more of the other participants in the talkgroup 1402 and the related talkgroup 1401.

Furthermore, the various examples of FIG. 7 to FIG. 15 may be combined; for example, the given user 103-3 speaking on the talkgroup 1402 may state that an incident has occurred at a given location, and the one of the users 103 on the talkgroup 1401 may be at the given location and/or mention the given location in the talkgroup 1401; hence, the user 103 at the given location and/or that mentions the given location may be automatically included in the talkgroup 1402 (e.g. by linking the talkgroups 1401, 1402) and their volume may be automatically differentially increased volume, as described above.

Figure 16:
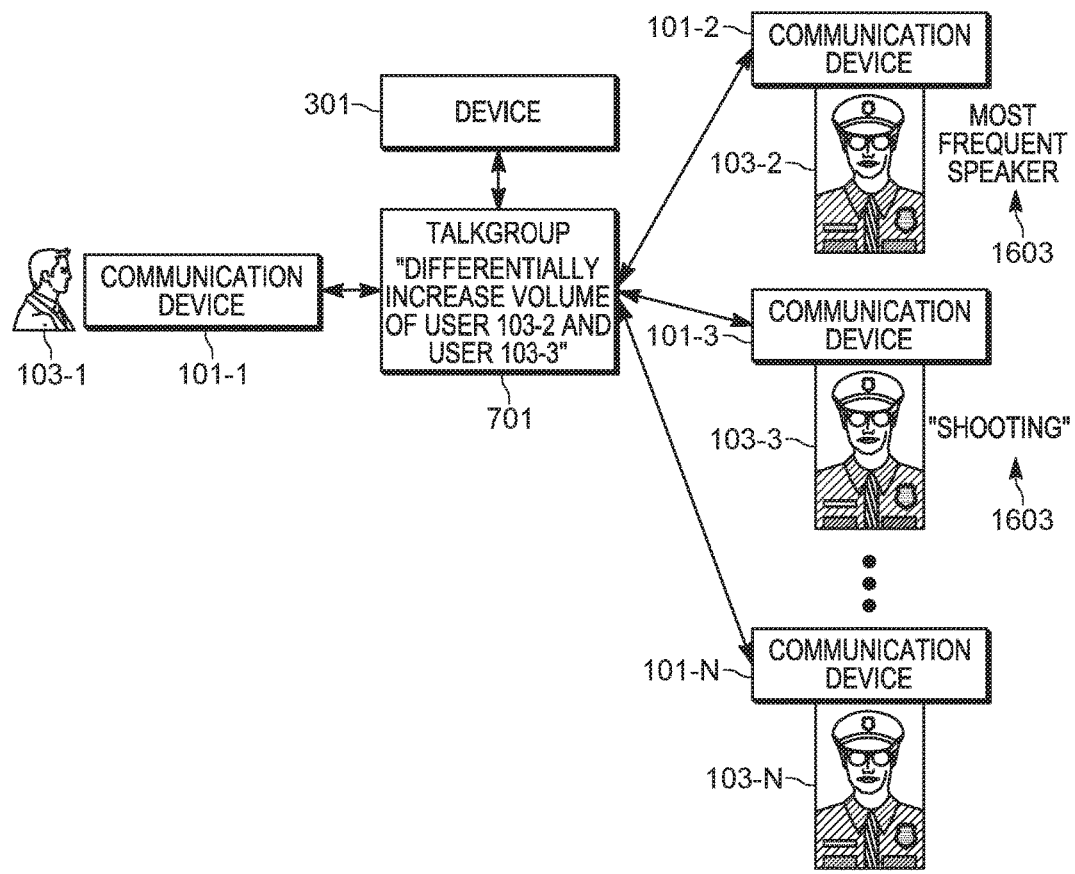
FIG. 16 depicts a volume of two speakers being differentially increased in a talkgroup in accordance with some embodiments.

Attention is next directed to FIG. 16, which is similar to FIG. 7, and which depicts that the device 301 has determined context data 1603 that indicates that the user 103-2 is the "Most Frequent Speaker" and that the user 103-3 has said a keyword "Shooting". Hence, as indicated in the talkgroup 701, the volume of both users 103-2, 103-3 have been differentially increased relative to the other users 103-N, at least at the device 101-1. Hence, in FIG. 16, the context data 1603 includes both a respective frequency of speaking of one or more of the plurality of participants in the talkgroup and keywords. While not depicted, recorded speech that includes keywords of the context data 1603 may be played back at least at the device 101-1.

Hence, in the example of FIG. 16, the controller 320 of the device 301 is further configured to differentially increase the volume in the talkgroup 701 of a second participant, of the plurality of participants in the talkgroup, relative to the other participants of the plurality of participants, based on the context data 1603.

Furthermore, a number of the participants in the talkgroup whose volume is differentially increased may depend on one or more of a priority of different context data. For example, in FIG. 16, the context data 1603 that includes the keyword "Shooting" may be given a higher priority than a most frequent speaker and only the volume of the user 103-3 may be differentially increased. Indeed, any suitable scheme for prioritizing context data is within the scope of the present specification.

Furthermore, a number of the participants in the talkgroup whose volume is differentially increased may depend on whether the stressed state of the given user 103-1 is increasing or decreasing in stress. For example, a number of the participants, whose volume is differentially increased, may be increased as the stressed state of the given user 103-1 is decreasing in stress; similarly, a number of the participants, whose volume is differentially increased, may be decreased as the stressed state of the given user 103-1 is increasing in stress. The increase or decrease in stress may be indicated, for example, by increasing or decreasing heart rate.

Figure 17:
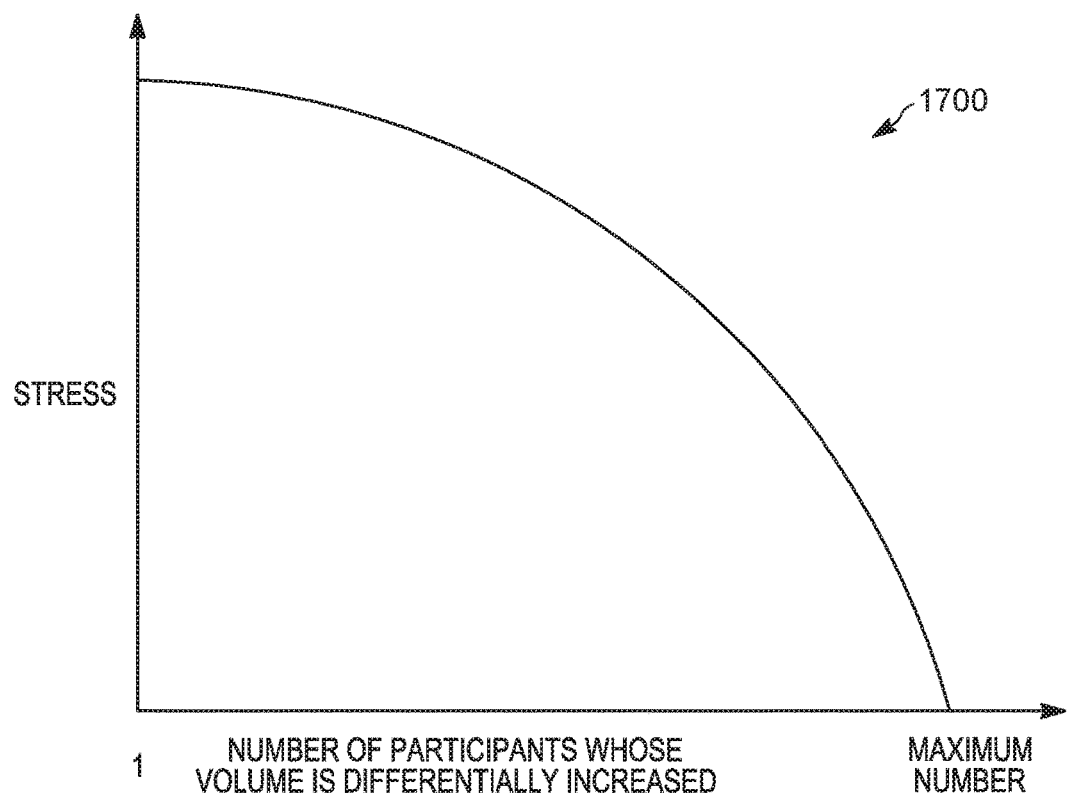
FIG. 17 depicts a graph showing increase and decrease in a number of speakers whose volume is differentially increased as stress of a given user decreases and increases in accordance with some embodiments.

For example, attention is next directed to FIG. 17 which depicts a graph 1700 of stress (e.g. on the "y" axis) vs a number of participants in a talkgroup whose volume differentially increased (e.g. on the "x" axis). The stress increasing or decreasing may be indicative of heart rate increasing or decreasing. Furthermore, the minimum number of participants in a talkgroup whose volume is differentially increased is "1". While in the graph 1700, the maximum number of participants in a talkgroup whose volume is differentially increased may be the total number of participants in a talkgroup, when the stress level of the given user 301-1 is low, in such examples the volume of all participants in a talkgroup may be the same, such that no participants in a talkgroup have their volume differentially increased.

While the graph 1700 is depicted with a particular shape, the shape is merely meant to represent the number of participants in a talkgroup whose volume is higher than other participants increasing or decreasing as the stress correspondingly decreases or increases. Indeed, the shape of the graph 1700 may be adapted to any particular scheme for increasing or decreasing the number of participants in a talkgroup whose volume differentially increased based on stress of a given user 103.

Furthermore, while the shape of the graph 1700 is smooth, a person of skill in the art understands that a change in number of participants in a talkgroup whose volume differentially increased occurs step-wise.

Hence, the controller 320 of the device 301 may be adapted to change a number of participants in a talkgroup whose volume differentially increased based on the graph 1700 and/or a similar functions and/or graph. In particular, the controller 320 of the device 301 may be further configured to: differentially change the volume, in a talkgroup, of one or more participants, of a plurality of participants, relative to the other participants, of the plurality of participants, as current biometric data (e.g. current biometric data 572 indicates the stressed state of a given user 103 is increasing or decreasing in stress. The controller 320 of the device 301 may be further configured to: increase a number of the participants whose volume is differentially increased as the stressed state is decreasing in stress; and decrease the number of the participants whose volume is differentially increased as the stressed state is increasing in stress.

While heretofore adjusting volume of talkgroups has been described, similar schemes may be applied to adjusting relative size of a user interface of a talkgroup and specifically a user interface rendered at a display screen of a dispatcher. For example, in some examples, the device 301 may be configured to control a user interface of a display screen of the device 101-1, for example, when the user 103-1 is a dispatcher and/or the device 101-1 comprises a dispatcher terminal, and the like. Such a mode of the device 301 may be implemented using one of the applications 323.

Figure 18:
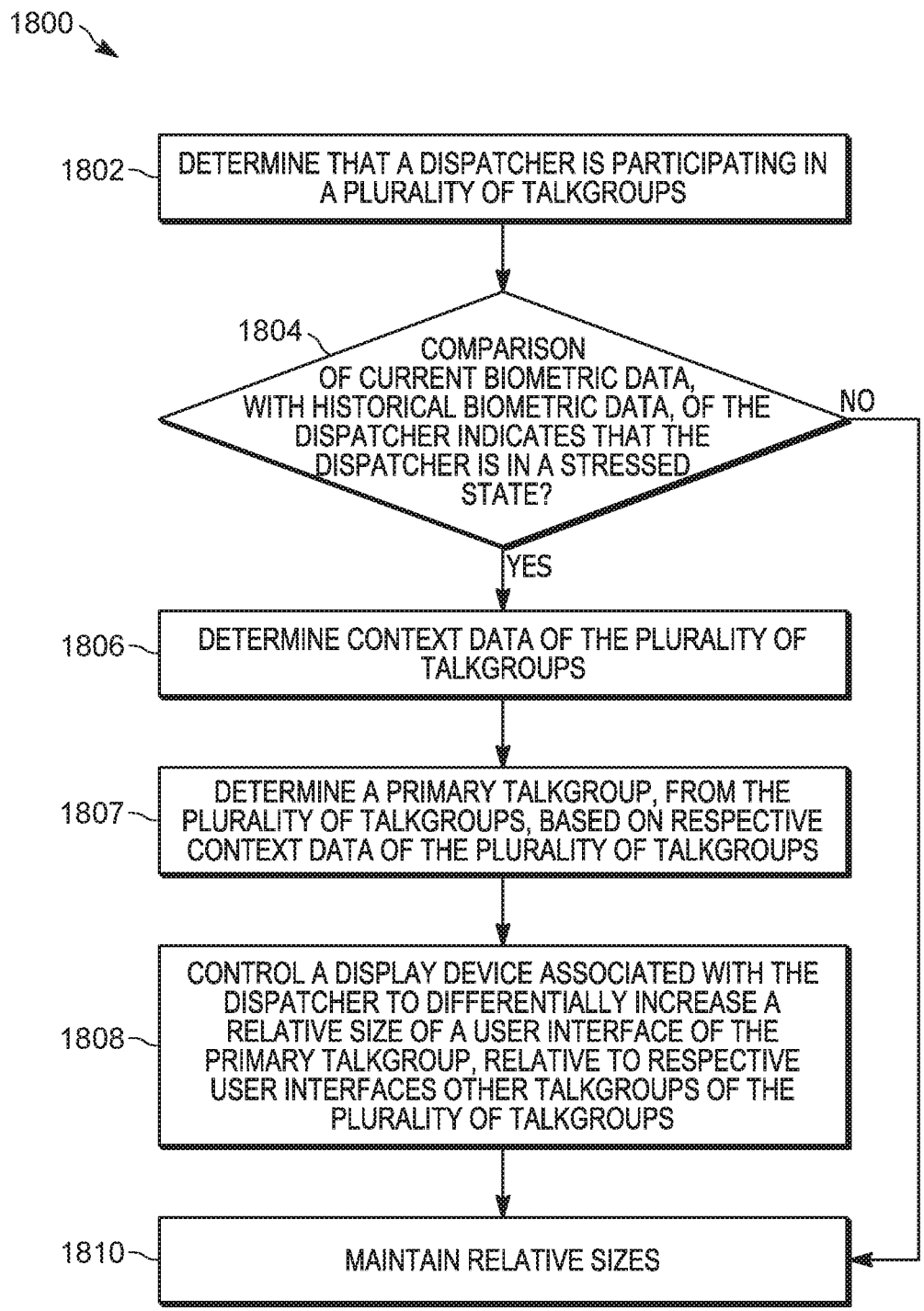
FIG. 18 depicts a flowchart of a method for adjusting relative size of talkgroup user interfaces in accordance with some embodiments.

For example, attention is now directed to FIG. 18 which depicts a flowchart representative of a method 1800 for adjusting relative size of a user interface of a talkgroup. The operations of the method 1800 of FIG. 18 correspond to machine readable instructions that are executed by, for example, the example computing device 301, and specifically by the controller 320 of the example computing device 301. In the illustrated example, the instructions represented by the blocks of FIG. 18 are stored at the memory 322 for example, as one of the applications 323. The method 1800 of FIG. 18 is one way in which the controller 320 and/or the example computing device 301 and/or the system 100 is configured. Furthermore, the following discussion of the method 1800 of FIG. 18 will lead to a further understanding of the system 100, and its various components. However, it is to be understood that the method 1800 and/or the system 100 may be varied, and need not work exactly as discussed herein in conjunction with each other, and that such variations are within the scope of present example embodiments.

The method 1800 of FIG. 18 need not be performed in the exact sequence as shown and likewise various blocks may be performed in parallel rather than in sequence. Accordingly, the elements of method 1800 are referred to herein as "blocks" rather than "steps." The method 1800 of FIG. 18 may be implemented on variations of the system 100 of FIG. 1, as well.

Furthermore, while it is understood by a person of skill in the art hereafter that the method 1800 is performed at the device 301, the method 1800 may be performed at one or more of the devices of the system 100, for example at a combination of one or more of the devices 101, the infrastructure controller 156, the dispatch computing device 158, and/or the analytical computing device 162, etc.

At a block 1802, the controller 320 of the device 301 determines that a given user 103 is a dispatcher communicating in plurality of talkgroups.

At a block 1804, the controller 320 of the device 301 determines whether a comparison of current biometric data of the dispatcher with the historical biometric data 172 of the dispatcher indicates that the dispatcher is in a stressed state. For example, the controller 320 of the device 301 may receive current biometric data of the dispatcher as described above.

The controller 320 of the device 301 may further retrieve the historical biometric data 172 of the dispatcher from the databases 163 based on the respective user identifier 171 and/or a respective device identifier.

When the comparison of current biometric data of the dispatcher with the historical biometric data 172 of the dispatcher indicates that the dispatcher is in a stressed state (e.g. a "YES" decision at the block 1804), at a block 1806 the controller 320 of the device 301 determines context data for plurality of talkgroups, similar to determining context data for talkgroups as described above. However, the context data for the talkgroups according to the method 1800 may include, but is not limited to, priority of talkgroups, incidents associated with talkgroups, number of participants in talkgroups, and the like.

At a block 1807, the controller 320 of the device 301 determines a primary talkgroup, from the plurality of talkgroups, based on respective context data of the plurality of talkgroups. For example, the context data of one talkgroup may indicate a higher number of participants than the other talkgroups and/or the context data of one talkgroup may indicate that the one talkgroups is of a higher priority of than the other talkgroups (e.g. the one talkgroup may be associated with a current high priority public safety incident, such as a fire, a murder, and the like).

At a block 1808, the controller 320 of the device 301 controls a display screen associated with the dispatcher to differentially increase a relative size of a user interface of the primary talkgroup, relative to respective user interfaces other talkgroups of the plurality of talkgroups. For example, the user interface of the primary talkgroup may be controlled to be larger than the respective user interfaces of the other talkgroups.

Otherwise, when the comparison of current biometric data of the dispatcher with the historical biometric data 172 of the dispatcher indicates that the dispatcher is not in a stressed state (e.g. a "NO" decision at the block 1804), at a block 1810, the controller 320 of the device 301 maintains relative sizes of the talkgroups.

Figure 19:
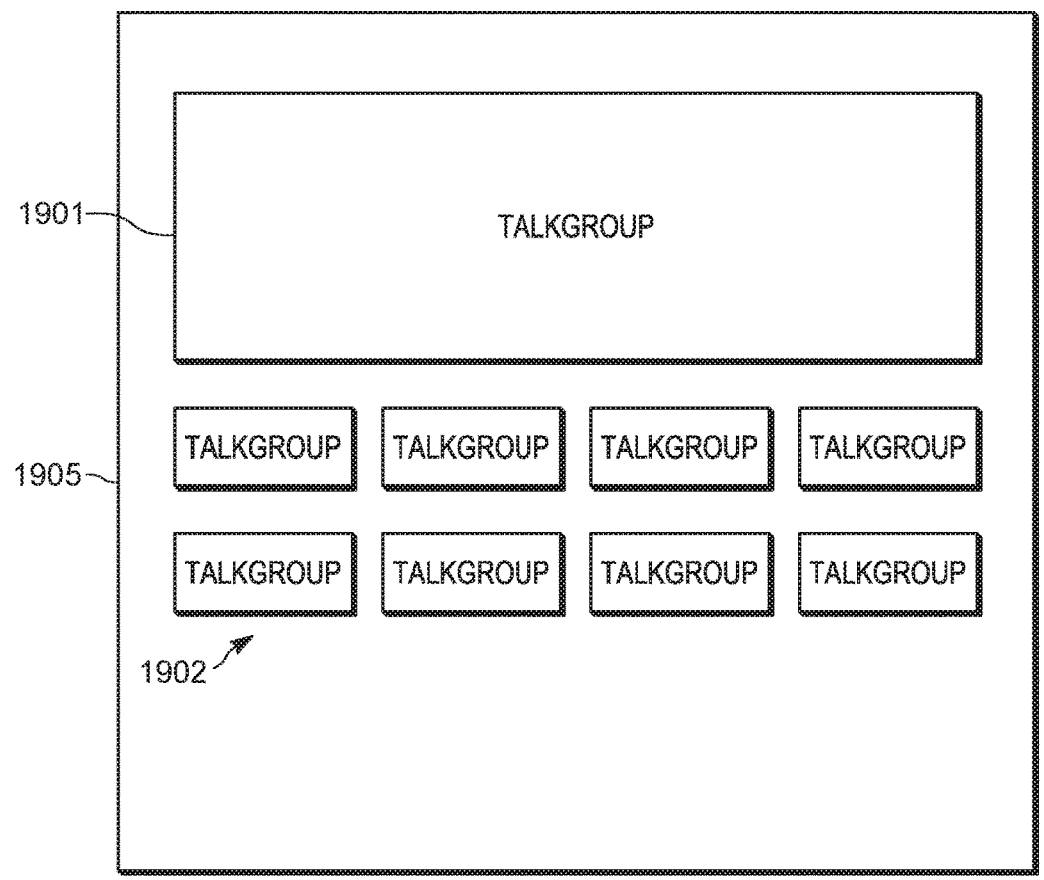
FIG. 19 depicts relative size of talkgroup user interfaces being adjusted in accordance with some embodiments.

An example of the method 1800 is depicted in FIG. 19 which depicts a user interface 1901 of a talkgroup that has been determined to have higher priority, and the like, as compared to other talkgroups, represented by user interfaces 1902. The user interfaces 1901 are rendered at a display screen 1905, for example of the device 101-1. As such, a size of the user interface 1901 has been increased at the display screen 1905 relative to the user interfaces 1902 of the other talkgroups. As the context data of the talkgroups of the user interfaces 1901, 1902 changes (e.g. respective priority increases or decreases), the relative sizes of the user interfaces 1901, 1902 may be increased or decreased. Such a change in relative size assists a dispatcher in focusing their attention on user interfaces of currently most relevant and/or currently highest priority talkgroups.

Provided herein is a device, system and method for adjusting volume on talkgroups when a given user is in a stressed state. In particular, a volume of a participant in a talkgroup, different from the given user, may be differentially increased relative to the other participants in the talkgroup in order to assist the given user in focusing attention on the participant whose volume is differentially increased, which may lead to a reduction in the given user asking for information to be repeated, and the like, on the talkgroup which may reduce processing resources at a device of the given user and/or may reduce bandwidth usage of the talkgroup.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

In this document, language of "at least one of X, Y, and Z" and "one or more of X, Y and Z" may be construed as X only, Y only, Z only, or any combination of two or more items X, Y, and Z (e.g., XYZ, XY, YZ, XZ, and the like). Similar logic may be applied for two or more items in any occurrence of "at least one . . . " and "one or more . . . " language.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A device comprising:
 a communication unit; and
 a controller communicatively coupled to the communications unit,
 the controller having access to a memory storing historical biometric data indicative of stress for a given user that participates in talkgroups;
 the controller configured to:
  determine that the given user is communicating in a talkgroup that includes a plurality of participants different from the given user; and
  when a comparison of current biometric data of the given user with the historical biometric data indicates that the given user is in a stressed state:
   differentially increase volume, in the talkgroup, of one participant, of the plurality of participants, relative to other participants of the plurality of participants, based on context data of one or more of the talkgroup and the plurality of participants.

2. The device of claim 1, wherein the controller is further configured to: differentially increase the volume of the one participant, relative to the other participants, at least at a communication device of the given user.

3. The device of claim 1, wherein the controller is further configured to: differentially increase the volume of the one participant, relative to the other participants, by one or more of:
 increasing the volume of the one participant and
 lowering the volume of the other participants.

4. The device of claim 1, wherein the controller is further configured to:
 differentially increase the volume in the talkgroup of a second participant, of the plurality of participants in the talkgroup, relative to the other participants of the plurality of participants, based on the context data.

5. The device of claim 1, wherein the controller is further configured to:
 record speech in the talkgroup, the speech including the context data; and
 when the volume of the one participant is differentially increased, play back at least a portion of recorded speech of the one participant that includes the context data.

6. The device of claim 1, wherein the controller is further configured to:
 link a related talkgroup, with the talkgroup, based on respective context data of a respective participant in the related talkgroup; and
 differentially increase respective volume of the respective participant, relative to one or more of the other participants in the talkgroup and the related talkgroup.

7. The device of claim 1, wherein the controller is further configured to:
 differentially change the volume, in the talkgroup, of one or more participants, of the plurality of participants, relative to the other participants, of the plurality of participants, as the current biometric data indicates the stressed state of the given user is increasing or decreasing in stress.

8. The device of claim 7, wherein the controller is further configured to:
 increase a number of the participants whose volume is differentially increased as the stressed state is decreasing in stress; and
 decrease the number of the participants whose volume is differentially increased as the stressed state is increasing in stress.

9. The device of claim 1, wherein the context data includes one or more of:
 respective locations of one or more of the plurality of participants;
 a respective frequency of speaking of one or more of the plurality of participants;

keywords spoken by one or more of the plurality of participants;
a respective conversation with the given user by one or more of the plurality of participants
a sequence of the respective conversation with the given user by one or more of the plurality of participants;
respective sensor data associated with one or more of the plurality of participants; and
respective roles of one or more of the plurality of participants.

10. The device of claim 1, wherein the given user is a dispatcher participating in a plurality of talkgroups, including the talkgroup, and the controller is further configured to:
when a comparison of the current biometric data of the given user with the historical biometric data indicates that the given user is in the stressed state:
determine a primary talkgroup, from the plurality of talkgroups, based on respective context data of the plurality of talkgroups; and
control a display screen associated with the dispatcher to differentially increase a relative size of a user interface of the primary talkgroup, relative to respective user interfaces other talkgroups of the plurality of talkgroups.

11. A method comprising:
determining, at a controller, that a given user is communicating in a talkgroup that includes a plurality of participants different from the given user, the controller having access to a memory storing historical biometric data indicative of stress for the given user; and
when a comparison of current biometric data of the given user with the historical biometric data indicates that the given user is in a stressed state:
differentially increasing, using the controller, volume in the talkgroup, of one participant, of the plurality of participants, relative to other participants of the plurality of participants, based on context data of one or more of the talkgroup and the plurality of participants.

12. The method of claim 11, further comprising: differentially increasing the volume of the one participant, relative to the other participants, at least at a communication device of the given user.

13. The method of claim 11, further comprising: differentially increasing the volume of the one participant, relative to the other participants, by one or more of:
increasing the volume of the one participant and lowering the volume of the other participants.

14. The method of claim 11, further comprising:
differentially increasing the volume in the talkgroup of a second participant, of the plurality of participants in the talkgroup, relative to the other participants of the plurality of participants, based on the context data.

15. The method of claim 11, further comprising:
recording speech in the talkgroup, the speech including the context data; and
when the volume of the one participant is differentially increased, playing back at least a portion of recorded speech of the one participant that includes the context data.

16. The method of claim 11, further comprising:
linking a related talkgroup, with the talkgroup, based on respective context data of a respective participant in the related talkgroup; and
differentially increasing respective volume of the respective participant, relative to one or more of the other participants in the talkgroup and the related talkgroup.

17. The method of claim 11, further comprising:
differentially changing the volume, in the talkgroup, of one or more participants, of the plurality of participants, relative to the other participants, of the plurality of participants, as the current biometric data indicates the stressed state of the given user is increasing or decreasing in stress.

18. The method of claim 17, further comprising:
increasing a number of the participants whose volume is differentially increased as the stressed state is decreasing in stress; and
decreasing the number of the participants whose volume is differentially increased as the stressed state is increasing in stress.

19. The method of claim 11, wherein the context data includes one or more of:
respective locations of one or more of the plurality of participants;
a respective frequency of speaking of one or more of the plurality of participants;
keywords spoken by one or more of the plurality of participants;
a respective conversation with the given user by one or more of the plurality of participants
a sequence of the respective conversation with the given user by one or more of the plurality of participants;
respective sensor data associated with one or more of the plurality of participants; and
respective roles of one or more of the plurality of participants.

20. The method of claim 11, wherein the given user is a dispatcher participating in a plurality of talkgroups, including the talkgroup, and the method further comprises:
when a comparison of the current biometric data of the given user with the historical biometric data indicates that the given user is in the stressed state:
determining a primary talkgroup, from the plurality of talkgroups, based on respective context data of the plurality of talkgroups; and
controlling a display screen associated with the dispatcher to differentially increase a relative size of a user interface of the primary talkgroup, relative to respective user interfaces other talkgroups of the plurality of talkgroups.

* * * * *